United States Patent
Ma

(10) Patent No.: US 12,188,775 B2
(45) Date of Patent: Jan. 7, 2025

(54) METHOD AND APPARATUS FOR RECOGNIZING SPECIAL ROAD CONDITION, ELECTRONIC DEVICE, AND STORAGE MEDIUM

(71) Applicant: HUAWEI TECHNOLOGIES CO., LTD., Guangdong (CN)

(72) Inventor: Pengfei Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 17/892,449

(22) Filed: Aug. 22, 2022

(65) Prior Publication Data

US 2022/0397406 A1     Dec. 15, 2022

Related U.S. Application Data

(63) Continuation of application No. PCT/CN2020/076654, filed on Feb. 25, 2020.

(51) Int. Cl.
*G01C 21/34* (2006.01)
*B60W 60/00* (2020.01)
(Continued)

(52) U.S. Cl.
CPC ....... *G01C 21/3453* (2013.01); *B60W 60/001* (2020.02); *G01C 21/3647* (2013.01);
(Continued)

(58) Field of Classification Search
None
See application file for complete search history.

(56) References Cited

U.S. PATENT DOCUMENTS

| 6,434,472 B1 | 8/2002 | Minowa et al. |
| 2011/0304447 A1* | 12/2011 | Marumoto ............ G07C 5/085 340/438 |

(Continued)

FOREIGN PATENT DOCUMENTS

| CN | 101549683 A | 10/2009 |
| CN | 102799173 A | 11/2012 |

(Continued)

OTHER PUBLICATIONS

Chu et al., "Designed on the Low Cost System Framework of Road Condition Recognition Based on Roadside Multi-sensors," 2009 Asia-Pacific Conference on Information Processing, Jul. 18, 2009, 4 pages.

(Continued)

*Primary Examiner* — Amelia Vorce
(74) *Attorney, Agent, or Firm* — Fish & Richardson P.C.

(57) ABSTRACT

An example apparatus includes at least one processor and at least one memory coupled to the at least one processor and storing programming instructions for execution by the at least one processor to: obtain map data at a current moment, where the map data includes a first road area at the current moment, the special road condition is located in the first road area, the first road area is obtained based on a road condition model and a vehicle parameter within a preset time period before the current moment, and the road condition model represents a correspondence between a feature of the vehicle parameter and the special road condition; and determine, based on a planned route of a vehicle, that a second road area exists in the planned route of the vehicle, where the second road area is in the first road area.

30 Claims, 10 Drawing Sheets

(51) Int. Cl.
*G01C 21/00* (2006.01)
*G01C 21/36* (2006.01)
*G06V 10/774* (2022.01)
*G06V 20/56* (2022.01)
*G07C 5/00* (2006.01)
*G08G 1/01* (2006.01)
*G08G 1/0969* (2006.01)

(52) U.S. Cl.
CPC ....... *G01C 21/3815* (2020.08); *G06V 10/774* (2022.01); *G06V 20/588* (2022.01); *G08G 1/0129* (2013.01); *G08G 1/0969* (2013.01); *B60W 2556/10* (2020.02); *B60W 2556/40* (2020.02); *G07C 5/008* (2013.01)

(56) References Cited

U.S. PATENT DOCUMENTS

| | | | |
|---|---|---|---|
| 2013/0127113 A1 | 5/2013 | Davenport et al. | |
| 2016/0324366 A1 | 11/2016 | Wu et al. | |
| 2018/0025638 A1* | 1/2018 | Fulger | G01C 21/3453 455/456.3 |
| 2018/0158326 A1* | 6/2018 | Fowe | G08G 1/0112 |
| 2018/0304899 A1 | 10/2018 | Cheng et al. | |
| 2018/0315319 A1* | 11/2018 | Spector | G08G 1/0104 |
| 2019/0118813 A1 | 4/2019 | Chen et al. | |
| 2019/0351911 A1* | 11/2019 | Anezaki | B60W 50/14 |
| 2020/0051428 A1* | 2/2020 | Yang | G08G 1/0141 |
| 2020/0189590 A1* | 6/2020 | Luo | G06N 3/08 |
| 2020/0200549 A1* | 6/2020 | Lindemann | G01C 21/3655 |
| 2021/0004017 A1* | 1/2021 | Colgate | G01C 21/30 |
| 2021/0004363 A1* | 1/2021 | Bailly | G06T 17/05 |
| 2021/0124088 A1* | 4/2021 | Hattori | G01C 21/3461 |
| 2021/0171031 A1* | 6/2021 | Bharti | B60W 30/18072 |
| 2021/0197846 A1* | 7/2021 | Thakur | G01S 17/931 |
| 2021/0365701 A1* | 11/2021 | Eshet | G06T 7/32 |
| 2023/0080592 A1* | 3/2023 | Kroeller | G06N 3/08 701/533 |

FOREIGN PATENT DOCUMENTS

| | | |
|---|---|---|
| CN | 104809901 A | 7/2015 |
| CN | 104899818 A | 9/2015 |
| CN | 105355039 A | 2/2016 |
| CN | 105427606 A | 3/2016 |
| CN | 107003429 A | 8/2017 |
| CN | 107038884 A | 8/2017 |
| CN | 108513676 A | 9/2018 |
| CN | 108764042 A | 11/2018 |
| CN | 108827337 A | 11/2018 |
| CN | 109035239 A | 12/2018 |
| CN | 109101022 A | 12/2018 |
| CN | 109191911 A | 1/2019 |
| CN | 109754594 A | 5/2019 |
| CN | 109785633 A | 5/2019 |
| CN | 109974734 A | 7/2019 |
| CN | 109983304 A | 7/2019 |
| CN | 110021182 A | 7/2019 |
| CN | 110047306 A | 7/2019 |
| CN | 110148294 A | 8/2019 |
| CN | 110298311 A | 10/2019 |
| CN | 110335488 A | 10/2019 |
| CN | 110660141 A | 1/2020 |
| EP | 0580167 A1 | 1/1994 |
| IN | 108692733 A | 10/2018 |
| JP | 2007051973 A | 3/2007 |
| JP | 2010198533 A | 9/2010 |
| JP | 2019168607 A | 10/2019 |
| WO | 2016188363 A1 | 12/2016 |
| WO | 2018119902 A1 | 7/2018 |
| WO | 2019028798 A1 | 2/2019 |
| WO | 2019085807 A1 | 5/2019 |

OTHER PUBLICATIONS

Yu, "Traffic sign Detection for the Driverless Vehicle," Thesis for the degree of Master of Engineering, Zhejiang University, School of Computer Science and Technology, Jan. 2016, 73 pages (with English Abstract).
Office Action in Chinese Appln. No. 202080004502.5, dated Mar. 28, 2022, 8 pages (with English translation).
Office Action in Chinese Appln. No. 202080004502.5, dated Jun. 24, 2021, 36 pages (with English translation).
Extended European Search Report in European Appln. No. 20922073.0, dated Dec. 23, 2022, 10 pages.
International Search Report and Written Opinion in International Appln. No. PCT/CN2020/076654, mailed on Dec. 2, 2020, 17 pages (with English translation).
Office Action in Japanese Appln. No. 2022-550856, mailed on Dec. 5, 2023, 9 pages (with English translation).

* cited by examiner

CONT.
FROM
FIG. 5A

CONT.
FROM
FIG. 5A

S507: Determine, based on a planned route of the vehicle, whether a second road area exists in the planned route of the vehicle S508: If the vehicle is an autonomous vehicle and the second road area exists in the planned route of the vehicle, generate a driving instruction, where the driving instruction is used to indicate a driving behavior of the vehicle S509: When the vehicle travels to the second road area, control travelling of the vehicle based on the driving instruction S510: If the vehicle is a non-autonomous vehicle, and the second road area exists in the planned route of the vehicle, generate a reminder message, where the reminder message is used to indicate that a special road condition exists in the second road area S511: When the vehicle is about to travel to the second road area, push the reminder message

FIG. 5B

METHOD AND APPARATUS FOR RECOGNIZING SPECIAL ROAD CONDITION, ELECTRONIC DEVICE, AND STORAGE MEDIUM

CROSS-REFERENCE TO RELATED APPLICATIONS

This application is a continuation of International Application No. PCT/CN2020/076654, filed on Feb. 25, 2020, the disclosure of which is hereby incorporated by reference in its entirety.

TECHNICAL FIELD

Embodiments of this application relate to Internet of Vehicles technologies, and in particular, to a method and an apparatus for recognizing a special road condition, an electronic device, and a storage medium.

BACKGROUND

With development of economy, vehicles in operation increase gradually. In a traveling process, a vehicle may encounter various special road conditions, such as a pit, a manhole with a loose cover or no cover, a speed bump, and a lane restriction. A driver may sometimes be unable to avoid the special road conditions, resulting in compromising driving experience or even danger. Therefore, how to effectively remind the vehicle to safely pass through a road section with a special road condition is particularly important.

In the conventional technology, a vehicle may collect an image around the vehicle in a traveling process, compare the collected image with a preset image of a special road condition, and remind the driver when recognizing that the image includes the special road condition; or a corresponding driving instruction may be sent to an autonomous vehicle based on the special road condition. For example, if there is a pit in front of the vehicle, the driving instruction may control the vehicle to decelerate, turn right to a right lane, or the like.

However, the conventional technology has a problem of poor real-time performance. For example, a special road condition cannot be recognized in time because the vehicle may have passed the special road condition at a high speed when an image with the special road condition is recognized.

SUMMARY

Embodiments of this application provide a method and an apparatus for recognizing a special road condition, an electronic device, and a storage medium, so that an area with the special road condition can be obtained in advance based on map data at a current moment, and real-time performance is high.

According to a first aspect, a method for recognizing a special road condition is provided. The method is applied to a terminal device, or may be applied to a chip in a terminal device. The following describes the method by using an example in which the method is applied to the terminal device. The method includes: The terminal device obtains map data at a current moment from a server, and the map data includes: a first road area at the current moment, where the first road area is a road area in which the special road condition is located: the first road area is obtained based on a road condition model and a vehicle parameter within a preset time period before the current moment; and the road condition model is used to represent a correspondence between a feature of the vehicle parameter and the special road condition, that is, the road condition model can recognize whether a special road condition exists in a road section area based on a vehicle parameter of the road section area within a period of time. The terminal device determines, based on a planned route of a vehicle, whether a second road area exists in the planned route of the vehicle, where the second road area is a road area in the first road area. It should be understood that the terminal device may periodically report the vehicle parameter to the server, and the vehicle parameter includes a dynamic parameter and a static parameter of the vehicle. The dynamic parameter of the vehicle includes a location of the vehicle, an image or a video shot by the vehicle, and traveling data of the vehicle. The traveling data of the vehicle may be a speed, an acceleration, and driving actions such as steering and braking of the vehicle. The static parameter of the vehicle is attribute data of the vehicle. The attribute data of the vehicle may include data such as a weight, a length, a width, and a height, and shock absorption of the vehicle. It should be noted that the vehicle reports the dynamic parameter and the static parameter of the vehicle when reporting the vehicle parameter for the first time, and reports the dynamic parameter when reporting the vehicle parameter subsequently.

It may be understood that the terminal device in this embodiment of this application may obtain map data at the current moment from the server in real time. Different from existing map data, the map data at the current moment includes the first road area with the special road condition, and the first road area is obtained by the server based on the reported vehicle parameter, obtained by the road condition model, and marked on a map. Because the reported vehicle parameter is massive data reported by a plurality of vehicles in real time, accuracy and real-time performance of obtaining the first road area can be improved. In addition, the terminal device may obtain latest information that is of the first road area on a road and that represents the special road condition in real time through the server.

In a possible design, the terminal device may perform a driving application of the vehicle based on the map data at the current moment.

According to an aspect, in a traveling process of the vehicle, whether a second road area with a special road condition exists in the planned route of the vehicle may be determined based on the map data at the current moment. A scenario with a special road condition in the planned route of the vehicle is described in the following two possible manners.

A scenario: The vehicle is an autonomous vehicle, and the second road area exists in the planned route of the vehicle. As the autonomous vehicle is not driven by a user, in this embodiment of this application, a driving instruction (driving decision) may be generated to control a driving behavior of the vehicle. When the vehicle travels to the second road area, traveling of the vehicle is controlled based on the driving instruction. Alternatively, when the vehicle travels to a preset distance away from the second road area, driving of the vehicle may be controlled based on the driving instruction, so as to effectively guide driving action decision-making.

In this embodiment of this application, the driving instruction may be generated based on the map data at the current moment. The map data further includes description information about the special road condition in the first road area, and the description information is used to describe a scenario type of the special road condition. Optionally, there are a plurality of road condition models. In this embodiment of this application, the driving instruction may be generated based on description information about a special road condition in the second road area. Specifically, a driving behavior indicated by a feature of a historical vehicle parameter used to obtain a target road condition model may be used as the driving instruction, where the target road condition model is a model for determining the second road area as the special road condition.

Another scenario: The vehicle is a non-autonomous vehicle, and the second road area exists in the planned route of the vehicle. As the non-autonomous vehicle is driven by a user, in this embodiment of this application, a reminder message may be generated to remind the user that the special road condition exists in the second road area, so that when the vehicle is about to travel to the second road area, the reminder message is pushed to remind the user of the special road condition in advance.

In this embodiment of this application, the driving instruction may be generated based on the map data at the current moment. The map data at the current moment further includes description information about and/or a target image of the special road condition in the first road area. The description information is used to describe a scenario type of the special road condition. The target image of the first road area is an image that includes the special road condition in the first road area in the vehicle parameter.

Optionally, in this embodiment of this application, description information about and/or a target image of the special road condition in the second road area is used as the reminder message. Specifically, when the vehicle is about to travel to the second road area, the description information about the special road condition in the second road area is played, and/or the target image of the special road condition in the second road area is displayed.

According to another aspect, in this embodiment of this application, a preset route may be further planned for the vehicle based on the map data at the current moment. Specifically, the terminal device may send a route planning request to a server, so that the server obtains a planned route, and then sends the planned route to the terminal device. When designing the planned route, the server can avoid planning a route including a special road condition, and can avoid that a vehicle travels to a special road condition that requires a large amount of time to pass. This improves passing efficiency and user experience.

In a possible design, an identifier of a special road condition in each first road area is displayed on a map of the terminal device. A selection instruction for an identifier of a special road condition in any first road area is received from a user. Description information about the special road condition in the first road area selected by the user is displayed.

In this design, the user may view information about any special road condition on the map, so that the user can actively select a traveling route. This improves user experience.

According to a second aspect, a method for recognizing a special road condition is provided. The method is applied to a server, and includes: The server obtains a first road area at a current moment based on a road condition model and a vehicle parameter within a preset time period before the current moment. The server marks the first road area on map data or removes an expired first road area from map data, to obtain map data at the current moment. The first road area is a road area in which the special road condition is located.

The road condition model is used to represent a correspondence between a feature of the vehicle parameter and the special road condition.

In this embodiment of this application, the server may periodically update the map data based on the reported vehicle parameter, to ensure real-timeness of the first road area in the map. In this way, the terminal device can obtain latest map data in real time, to implement pre-recognition and reminding of a special road condition.

In a possible design, to reduce a data processing amount of the server, in this embodiment of this application, a vehicle parameter of at least one vehicle received within the preset time period may be preprocessed to determine an initial road area. Then, a vehicle parameter corresponding to the initial road area is used as the vehicle parameter within the preset time period before the current moment. In this embodiment of this application, an area in which a location in a vehicle parameter that does not match a feature of a road at the location of the vehicle in the map data is located may be determined as the initial road area. Correspondingly, the vehicle parameter that does not match the feature of the road at the location of the vehicle in the map data is used as the vehicle parameter within the preset time period before the current moment.

It should be noted that the road condition model in this embodiment of this application is obtained by using a plurality of historical vehicle parameters as training parameters. The historical vehicle parameters are vehicle parameters that are received from the at least one vehicle before the preset time period.

In a possible design, vehicle parameters reported by different vehicles are different when the vehicles pass through road areas in which different special road conditions are located. Therefore, in this embodiment of this application, different road condition models may be trained for the different special road conditions, to improve accuracy of recognizing the special road conditions. Therefore, there are a plurality of road condition models in this embodiment of this application.

When the plurality of road condition models are trained, in this embodiment of this application, the plurality of historical vehicle parameters may be divided into N training data sets. Each training data set is used as training data for training a road condition model, to obtain at least one road condition model. A vehicle parameter in each training data set has a same feature, and N is an integer greater than 1. Correspondingly, the vehicle parameter within the preset time period before the current moment is input into the at least one road condition model to obtain the first road area.

In the foregoing method, a feature type of the first road area with the special road condition may be obtained based on the at least one road condition model and the vehicle parameter within the preset time period before the current moment, but a scenario type of the special road condition in the first road area cannot be determined. In a possible design, the scenario type of the special road condition in the first road area may be determined with reference to the image or the video that is shot by the vehicle in the reported vehicle parameter.

A target image of the first road area can be obtained. The target image of the first road area is an image that includes the special road condition in the first road area in the vehicle parameter. The target image is the image or a video frame in the video shot by the vehicle. In this embodiment of this application, description information about the special road condition in the first road area is generated based on the target image of the first road area. The description information is used to describe a scenario type of the special road condition. Specifically, a manner of generating the description information about the special road condition in the first road area may be as follows: The server in this embodiment of this application may pre-store a recognition model. The recognition model is used to represent a correspondence between a feature of an image and a scenario type of a special road condition, that is, input the image into the recognition model. The recognition model may recognize whether the image is an image including a pixel block of the special road condition, to determine the scenario type of the special road condition. Further, in this embodiment of this application, the description information about and/or the target image of the special road condition in the first road area may be added to the map data.

In a possible design, in this embodiment of this application, duration of the special road condition in the first road area is determined based on the scenario type of the special road condition represented by the description information about the special road condition in the first road area. The duration of the special road condition in the first road area is added to the map data.

In the foregoing two designs, in this embodiment of this application, the target image including the special road condition may be determined based on the image or the video in the vehicle parameter, to generate the description information about the special road condition, and duration of the special road condition can be further determined based on the scenario type of the special road condition. The information is added to the map data. In this way, after obtaining the map data at the current moment, the terminal device can generate a driving decision or reminder message, or plan a preset route for the vehicle.

Corresponding to the first aspect, when a terminal device requests a server to obtain a planned route of a vehicle, the server may receive a route planning request from the terminal device, obtain the planned route based on a start point and an end point, the duration of the special road condition in the first road area, and the scenario type of the special road condition in the first road area, and push the planned route to the terminal device. The route planning request includes the start point and the end point.

According to a third aspect, an apparatus for recognizing a special road condition is provided, including:
- a processing module, configured to: obtain map data at a current moment, where the map data includes a first road area at the current moment; and determine, based on a planned route of a vehicle, whether a second road area exists in the planned route of the vehicle, where the second road area is a road area in the first road area, the first road area is a road area in which the special road condition is located, the first road area is obtained based on a road condition model and a vehicle parameter within a preset time period before the current moment, and the road condition model is used to represent a correspondence between a feature of the vehicle parameter and the special road condition.

Optionally, if the vehicle is an autonomous vehicle, the processing module is further configured to: if the second road area exists in the planned route of the vehicle, generate a driving instruction; and when the vehicle travels to the second road area, control traveling of the vehicle based on the driving instruction, where the driving instruction is used to indicate a driving behavior of the vehicle.

Optionally, there are a plurality of road condition models, the map data further includes description information about the special road condition in the first road area, and the description information is used to describe a scenario type of the special road condition.

Correspondingly, the processing module is specifically configured to generate the driving instruction based on description information about a special road condition in the second road area. The driving behavior indicated by the driving instruction is the same as a driving behavior indicated by a feature of a historical vehicle parameter used to obtain a target road condition model. The target road condition model is a model for determining the second road area as the special road condition.

Optionally, if the vehicle is a non-autonomous vehicle, the processing module is further configured to: generate a reminder message if the second road area exists in the planned route of the vehicle; and push the reminder message when the vehicle is about to travel to the second road area, where the reminder message is used to indicate that a special road condition exists in the second road area.

Optionally, the map data further includes description information about and/or a target image of the special road condition in the first road area. The description information is used to describe a scenario type of the special road condition. The target image of the first road area is an image that includes the special road condition in the first road area in the vehicle parameter.

Correspondingly, the processing module is specifically configured to use description information about and/or a target image of the special road condition in the second road area as the reminder message.

A play module is configured to play the description information about the special road condition in the second road area; and/or,
  a display module is configured to display the target image of the special road condition in the second road area.

Optionally, the map data further includes duration of the special road condition in the first road area.

Optionally, there are a plurality of first road areas. The display module is further configured to display an identifier of a special road condition in each first road area on a map.

A transceiver module is configured to receive a selection instruction from a user for an identifier of a special road condition in any first road area. Correspondingly, the display module is further configured to display description information about the special road condition in the first road area selected by the user.

Optionally, the transceiver module is further configured to: send a route planning request to a server, and receive the planned route sent by the server.

Optionally, the transceiver module is further configured to report a vehicle parameter to the server. The vehicle parameter includes a location of the vehicle, an image or a video shot by the vehicle, and attribute data and traveling data of the vehicle.

For beneficial effects of the apparatus for recognizing a special road condition provided in the third aspect, refer to the beneficial effects brought by the first aspect and the possible designs. Details are not described herein again.

According to a fourth aspect, an apparatus for recognizing a special road condition is provided, including:
- a processing module, configured to: obtain a first road area at a current moment based on a road condition model and a vehicle parameter within a preset time period before the current moment; and mark the first road area on map data to obtain map data at the current moment. The first road area is a road area in which the special road condition is located. The road condition model is used to represent a correspondence between a feature of the vehicle parameter and the special road condition.

Optionally, the vehicle parameter includes a location of a vehicle.

A transceiver module is configured to receive, within the preset time period, a vehicle parameter reported by at least one vehicle.

Correspondingly, the processing module is further configured to determine, based on the vehicle parameter of the at least one vehicle, the vehicle parameter within the preset time period before the current moment. The vehicle parameter within the preset time period before the current moment is a vehicle parameter that does not match a feature of a road at the location of the vehicle in the map data.

Optionally, the processing module is further configured to obtain the road condition model by using a plurality of historical vehicle parameters as training parameters. The historical vehicle parameters are vehicle parameters that are received from the at least one vehicle before the preset time period.

Optionally, there are a plurality of road condition models.

The processing module is specifically configured to divide the plurality of historical vehicle parameters into N training data sets, and use each training data set as training data for training a road condition model, to obtain at least one road condition model. A vehicle parameter in each training data set has a same feature, and N is an integer greater than 1.

Optionally, the processing module is specifically configured to input the vehicle parameter within the preset time period before the current moment into the at least one road condition model to obtain the first road area.

Optionally, the vehicle parameter includes an image or a video shot by the vehicle.

The processing module is further configured to: obtain a target image of the first road area; generate description information about the special road condition in the first road area based on the target image of the first road area and add the description information about and/or the target image of the special road condition in the first road area to the map data. The target image of the first road area is an image that includes the special road condition in the first road area in the vehicle parameter. The target image is the image or a video frame in the video shot by the vehicle. The description information is used to describe a scenario type of the special road condition.

Optionally, the processing module is further configured to: determine duration of the special road condition in the first road area based on the scenario type of the special road condition represented by the description information about the special road condition in the first road area; and add the duration of the special road condition in the first road area to the map data.

Optionally, the processing module is further configured to: if a route planning request from a terminal device is received, obtain a planned route based on a start point and an end point, the duration of the special road condition in the first road area, and the scenario type of the special road condition in the first road area. The route planning request includes the start point and the end point.

The transceiver module is further configured to push the planned route to the terminal device.

Optionally, the vehicle parameter includes attribute data and traveling data of the vehicle.

For beneficial effects of the apparatus for recognizing a special road condition provided in the fourth aspect, refer to the beneficial effects brought by the second aspect and the possible designs. Details are not described herein again.

According to a fifth aspect, an electronic device is provided, including a processor, a memory, and a transceiver. The transceiver is coupled to the processor. The processor controls sending and receiving actions of the transceiver. The processor performs an action performed by the processing module according to the third aspect or the fourth aspect. The transceiver performs an action performed by the transceiver module according to the third aspect or the fourth aspect.

The memory is configured to store computer executable program code. The program code includes instructions. When the processor executes the instructions, the instructions cause the terminal device to perform the method according to the first aspect or the second aspect.

According to a sixth aspect, a computer program product that includes instructions is provided. When the instructions are run on a computer, the computer performs the method according to the first aspect or the second aspect.

According to a seventh aspect, a computer readable storage medium is provided. The computer readable storage medium stores instructions. When the instructions are run on a computer, the computer performs the method according to the first aspect or the second aspect.

Embodiments of this application provide a method and an apparatus for recognizing a special road condition, an electronic device, and a storage medium, so that a server can determine, based on massive reported vehicle parameters, a first road area in which the special road condition is located, update map data, and obtain map data at a current moment. It should be understood that the map data at the current moment includes the first road area. After obtaining the map data at the current moment, the terminal device may recognize whether a special road condition exists in the planned route of the vehicle, so as to recognize the special road condition in the planned route in advance. This improves real-time performance of recognizing a special road condition.

BRIEF DESCRIPTION OF DRAWINGS

FIG. 5A and FIG. 5B are a schematic flowchart 2 of a method for recognizing a special road condition according to an embodiment of this application;

DESCRIPTION OF EMBODIMENTS

Figure 1:
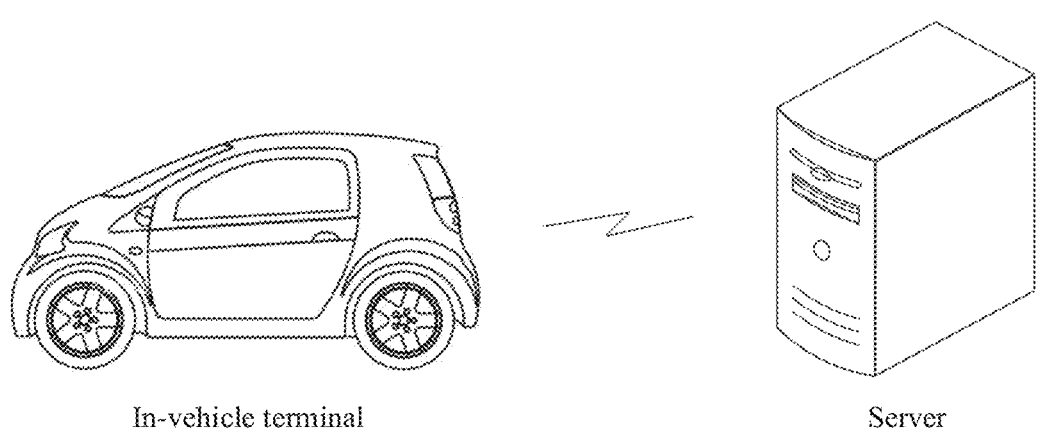
FIG. 1 is a schematic diagram of a scenario to which a method for recognizing a special road condition is applicable according to an embodiment of this application.

Currently, in a traveling process, a vehicle identifies a special road condition mainly based on a navigation prompt, recognition of an assisted driving sensor on the vehicle, or user recognition. However, existing navigation can prompt only special road conditions such as road construction and traffic congestion, but cannot prompt special road conditions such as manhole cover missing, an uneven manhole cover, a road depression or a pit, a road water accumulation, a high speed bump, temporary closure of a lane or a road section, and a traffic accident. Therefore, types of the special road conditions prompted by the navigation are incomprehensive. In addition, the navigation cannot provide a prompt for an unexpected special road condition, for example, an unexpected obstacle, a car accident, or a debris flow that occurs on a lane in time. Therefore, real-time performance is low. For a manner of recognizing a special road condition through the assisted driving sensor, the assisted driving sensor identifies, through a laser radar, a special road condition in which an obstacle exists on a road, but cannot recognize special road conditions such as a road depression or a pit, manhole cover missing, and a road water accumulation. Therefore, types of the special road conditions recognized by the assisted driving sensor are incomprehensive either. A user needs to depend on driving experience of the user to recognize a special road condition, and cannot recognize or avoid the special road condition because of carelessness or a slow response. It should be understood that the special road condition in this embodiment of this application may include: manhole cover missing, an uneven manhole cover, a road depression or pit, a road water accumulation, a high speed bump, lane closure for construction, temporary lane or road section closure, a traffic accident, a traffic jam, or the like.

To resolve the foregoing problem, a method for recognizing a special road condition by using an image collected in a traveling process of a vehicle is provided in the conventional technology. The vehicle compares the image collected in the traveling process with images of various preset special road conditions for recognition, and reminds the user when determining that the collected image includes a special road condition. However, the method has a problem of low real-time performance. As a traveling speed of the vehicle is high, when an image is collected and a special road condition is recognized in the image, the vehicle may have passed the special road condition at a high speed, and cannot be reminded in time. In addition, the method depends on a single image collected by the vehicle to recognize a special road condition. This may also cause a problem of low recognition accuracy.

To resolve the foregoing problem of low accuracy of recognizing a special road condition, in the conventional technology, a server may receive an image of a special road condition and a location of the special road condition that are uploaded by a user. In this way, a vehicle passing through the location of the special road condition is reminded. However, the method still has a problem of low real-time performance, and if no user uploads an image of a special road condition, the server cannot remind a user of the special road condition.

In recent years, with development of an Internet of Vehicles technology and a communication technology, a vehicle may report a vehicle parameter to an Internet of Vehicles cloud server in real time. Based on this, to resolve a problem in the conventional technology, an embodiment of this application provides a method for recognizing a special road condition. Various types of special road conditions are recognized by using massive vehicle parameters reported by vehicles in real time, and are marked on a map, to remind a traveling vehicle in real time. In this embodiment of this application, the special road conditions are recognized by the using the vehicle parameters reported by the massive vehicles in the traveling process in real time, so that accuracy and real-time performance of recognizing the special road conditions can be ensured. This supports real-time reminding.

FIG. 1 is a schematic diagram of a scenario to which a method for recognizing a special road condition is applicable according to an embodiment of this application. As shown in FIG. 1, the scenario includes a terminal device and a server. The terminal device is connected to the server in a wireless manner. The server may be an Internet of Vehicles cloud server. The terminal device may be a vehicle, an in-vehicle terminal in a vehicle, or the like.

The following describes, with reference to specific embodiments, the method for recognizing a special road condition provided in this application. The following several embodiments may be combined with each other, and same or similar concepts or processes may not be described again in some embodiments.

Figure 2:
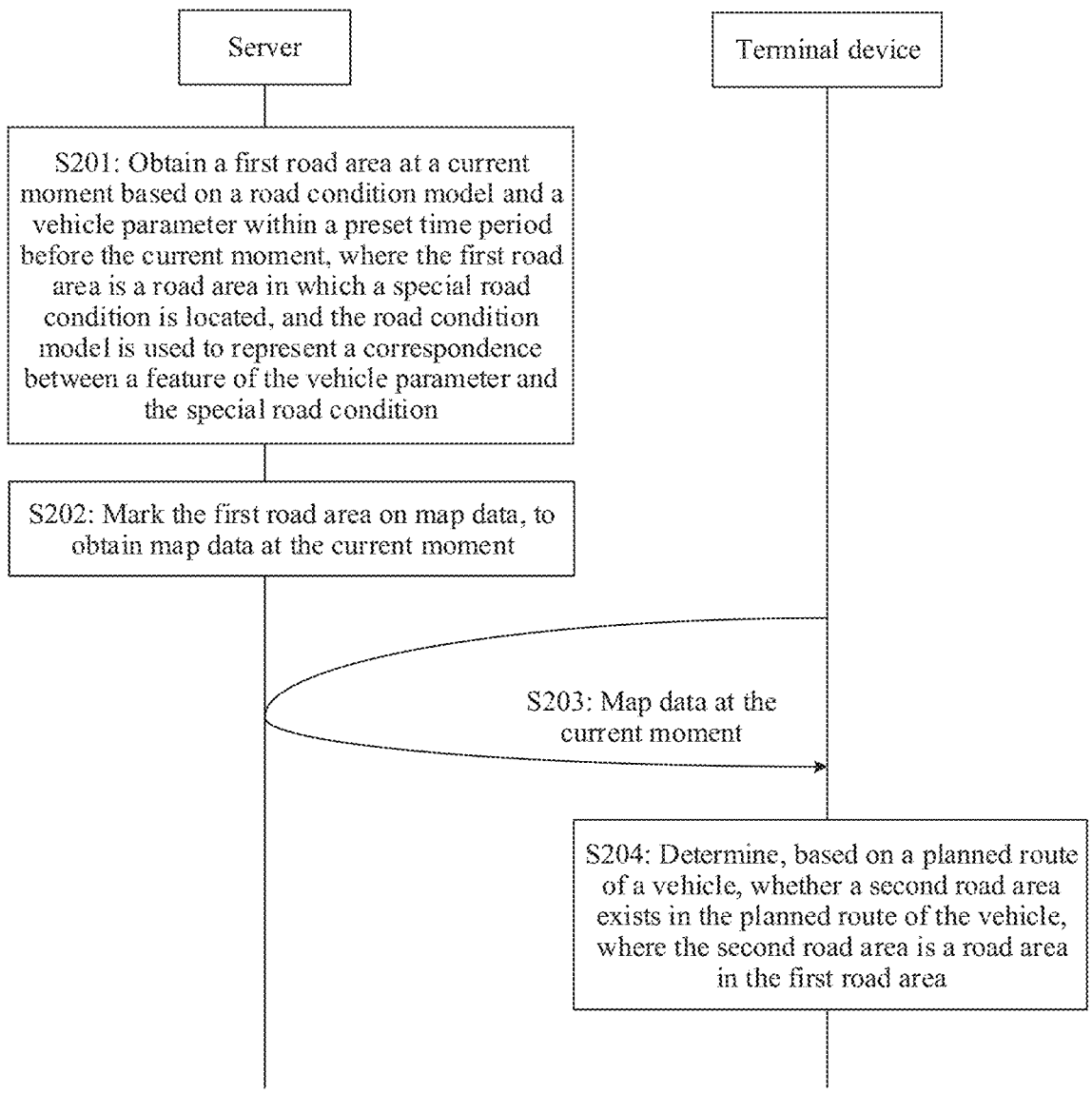
FIG. 2 is a schematic flowchart 1 of a method for recognizing a special road condition according to an embodiment of this application.

In FIG. 2, the method for recognizing a special road condition provided in this embodiment of this application is described from a perspective of interaction between the server and the terminal device. FIG. 2 is a schematic flowchart 1 of a method for recognizing a special road condition according to an embodiment of this application. As shown in FIG. 2, the method for recognizing a special road condition provided in this embodiment of this application may include the following steps.

S201: A server obtains a first road area at a current moment based on a road condition model and a vehicle parameter within a preset time period before the current moment, where the first road area is a road area in which the special road condition is located, and the road condition model is used to represent a correspondence between a feature of the vehicle parameter and the special road condition.

S202: The server marks the first road area on map data, to obtain map data at the current moment.

S203: A terminal device obtains the map data at the current moment.

S204: The terminal device determines, based on a planned route of a vehicle, whether a second road area exists in the planned route of the vehicle, where the second road area is a road area in the first road area.

In step S201, the road condition model is used to represent the correspondence between the feature of the vehicle parameter and the special road condition, that is, input the vehicle parameter into the road condition model. The road condition model may recognize whether a special road condition exists in a road section area based on a vehicle parameter of the road section area within a period of time. Optionally, the road condition model in this embodiment of this application is obtained based on a historically obtained vehicle parameter through a clustering algorithm or an AI algorithm such as machine learning. The AI algorithm may be an algorithm such as a decision tree algorithm, a random forest algorithm, logistic regression algorithm, a support vector machine algorithm, a naive Bayes algorithm, or a neural network algorithm. A type of the AI algorithm used to obtain the road condition model is not limited in this embodiment of this application.

The preset time period before the current moment is a predefined time period. In this embodiment of this application, to ensure real-time performance of obtaining a special road condition, the vehicle parameter within the preset time period before the current moment may be periodically used to obtain a road area in which the special road condition is located. For example, if the current moment is 8:00, the vehicle parameter within the preset time period before the current moment may be a vehicle parameter within a time period from 7:50 to 8:00. The vehicle parameter within the time period from 7:50 to 8:00 may be input into the road condition model, to obtain a road area in which a special road condition is located at 8:00.

In this embodiment of this application, the vehicle parameter within the preset time period before the current moment may be a vehicle parameter reported by the vehicle to the server within the preset time period before the current moment. It should be understood that the vehicle may periodically report a vehicle parameter in a traveling process. The vehicle parameter includes a dynamic parameter and a static parameter of the vehicle. The dynamic parameter of the vehicle includes a location of the vehicle, an image or a video shot by the vehicle, and traveling data of the vehicle. The traveling data of the vehicle may be a speed, an acceleration, and driving actions such as steering and braking of the vehicle. The static parameter of the vehicle is attribute data of the vehicle. The attribute data of the vehicle may include data such as a weight, a length, a width, and a height, and shock absorption of the vehicle. It should be noted that the vehicle reports the dynamic parameter and the static parameter of the vehicle when reporting the vehicle parameter for the first time, and reports the dynamic parameter when reporting the vehicle parameter subsequently.

In this embodiment of this application, a road area in which a special road condition is located at the current moment is used as the first road area. The first road area is a lane-level road area. For example, if the special road condition is a traffic jam, the first road area may be three lanes between an XX road and an XX road. If the special road condition is manhole cover missing, the first road area may be an area of a left lane on an XX road.

It should be understood that the "vehicle parameter within a preset time period before the current moment" may be a vehicle parameter reported by at least one vehicle within the preset time period.

Optionally, to reduce a data processing amount of the road condition model, in this embodiment of this application, a vehicle parameter of the at least one vehicle received within a preset time period may be preprocessed to determine an initial road area. Then, a vehicle parameter corresponding to the initial road area is used as the vehicle parameter within the preset time period before the current moment. The initial road area is a preliminarily determined road area in which a special road condition is located, and the vehicle parameter corresponding to the initial road area is a vehicle parameter of a vehicle whose location is in the initial road area in the vehicle parameter of at least one vehicle received within the preset time period. For example, an area 1 is determined as the initial road area based on vehicle parameters of N vehicles received within the preset time period, and then a vehicle parameter of a vehicle whose location is in the area 1 is obtained from the vehicle parameters of the N vehicles, and is used as the vehicle parameter within the preset time period before the current moment, that is, the vehicle parameter input into the road condition model.

In this embodiment of this application, an area in which a location in a vehicle parameter that does not match a feature of a road at the location of the vehicle in the map data is located may be determined as the initial road area. Correspondingly, the vehicle parameter that does not match the feature of the road at the location of the vehicle in the map data is used as the vehicle parameter within the preset time period before the current moment. For example, if a feature of a road in the area 1 in the map data is a straight lane for which a minimum vehicle speed is 60 Km/h, and it is determined, based on the vehicle parameter, that a vehicle speed in a vehicle parameter reported by a vehicle in the area 1 is 10 Km/h, 0 Km/h, or the like, it may be determined that the vehicle parameter in the area 1 does not match the feature of the road in the area 1, and a special road condition such as a traffic jam may exist in the area 1. In this case, the area 1 may be used as the initial road area, and a vehicle parameter of a vehicle whose location is in the area 1 is used as the vehicle parameter within the preset time period before the current moment.

In step S202, in this embodiment of this application, the first road area may be marked on the map data, and the map data is updated to obtain map data at the current moment. It should be understood that marking the first road area on the map data may be: marking a special road condition at a location corresponding to the first road area on the map, so that the first road area may be marked in the updated map data at the current moment.

Figure 3:
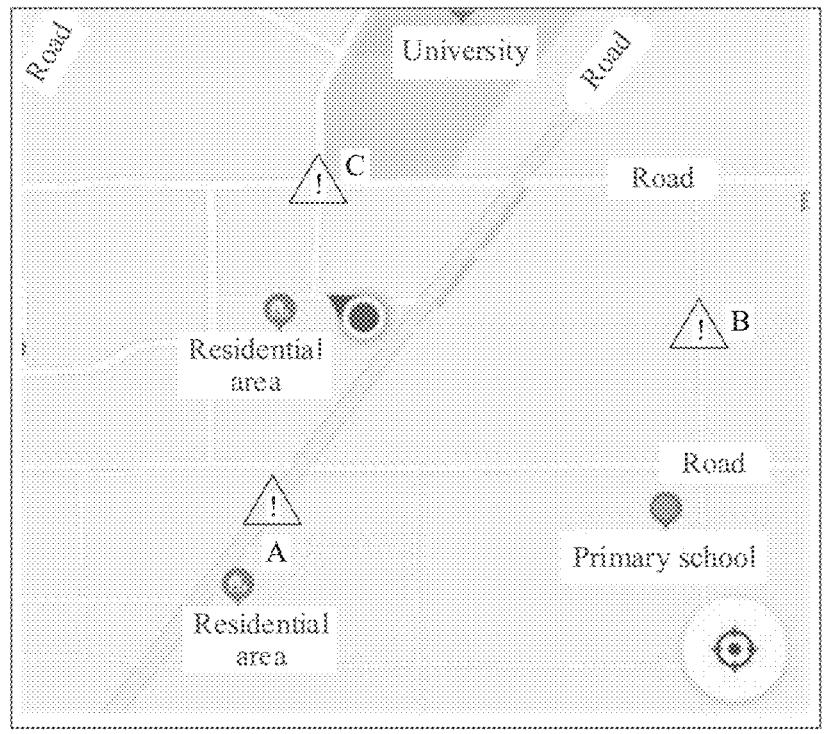
FIG. 3 is a schematic diagram 1 of a map according to an embodiment of this application.

FIG. 3 is a schematic diagram 1 of a map according to an embodiment of this application. As shown in FIG. 1, a first road area is marked at three locations (for example, A, B, and C) on the map. For example, FIG. 3 represents the first road area in a form of an "exclamation mark".

It should be noted that, in this embodiment of this application, map data may be further updated for elimination of a special road condition. For example, if a feature of a road in an area 1 in the map data is a straight lane for which a vehicle speed is less than 60 Km/h, and a vehicle speed in a vehicle parameter reported by a vehicle in the area 1 at a previous moment is 10 Km/h, 0 Km/h, or the like, the area 1 is marked as the first road area in map data at the previous moment. However, if it is determined, based on a vehicle parameter within a preset time period at a current moment, that a lowest vehicle speed in the vehicle parameter reported by the vehicle in the area 1 within a preset time period after the current moment is 60 Km/h or the like, it may be further determined that a special road condition at the previous moment in the area 1 disappears, and the map data may be updated to obtain map data at the current moment. A specific manner of updating the map data is: deleting, from the map, the area 1 marked as the first road area.

Figure 4:
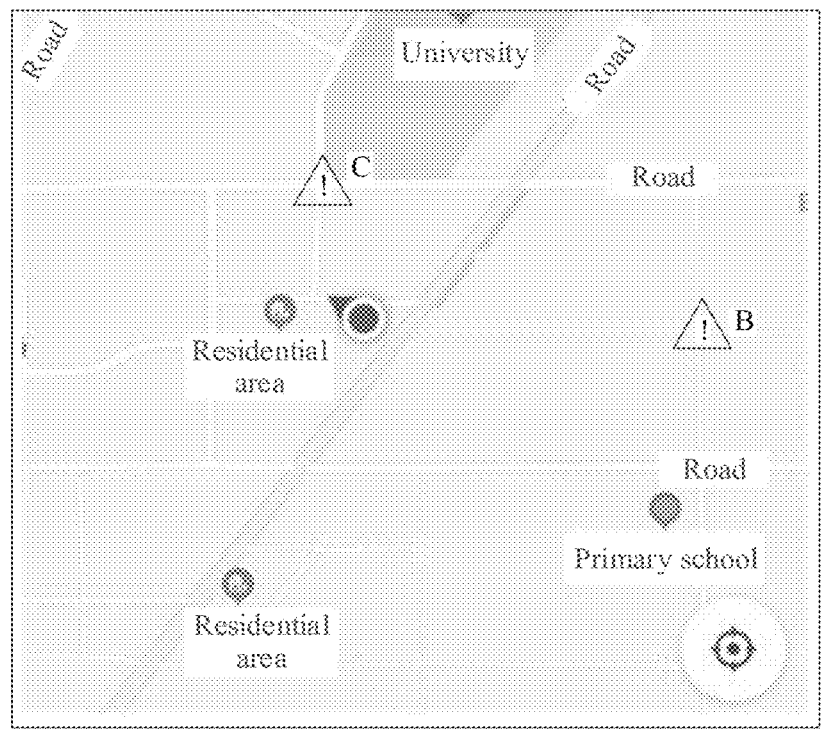
FIG. 4 is a schematic diagram 2 of a map according to an embodiment of this application.

FIG. 4 is a schematic diagram 2 of a map according to an embodiment of this application. Compared with FIG. 3, a special road condition at a location A in FIG. 4 is eliminated, and an updated map at the current moment is obtained, as shown in FIG. 4. In FIG. 4, a first road area is marked at a location B and a location C.

In step S203, the terminal device may obtain the map data at the current moment from the server. Optionally, an application program for displaying the map is installed in the terminal device, for example, a navigation application program or an autonomous driving map application program. The terminal device may obtain the map data at the current moment, to update the map data in the application program of the terminal device.

In step S204, according to step S203, the terminal device may obtain the map data at the current moment, so that an autonomous vehicle can obtain the first road area in advance. Correspondingly, the terminal device may display the first road area on the map, so that a user can learn of the first road area. In other words, in this embodiment of this application, the autonomous vehicle or a non-autonomous vehicle may obtain the first road area in advance based on the map data at the current moment. This resolves a problem of real-time performance in the conventional technology.

In this embodiment of this application, if the vehicle is traveling according to the planned route, the terminal device may determine, according to the planned route of the vehicle, whether a second road area exists in the planned route of the vehicle, that is, may recognize a special road condition in the planned route in advance. The second road area is a road area in the first road area. In other words, in this embodiment of this application, it may be pre-determined whether there is a road area in which a special road condition is located in the planned route of the vehicle. If the second road area exists in the planned route of the vehicle, a driving decision (for the autonomous vehicle, for details, refer to step S508 in the following embodiment) or advance reminding (for the non-autonomous vehicle) may be performed in advance, to implement timely reminding.

The planned route in this embodiment of this application may be obtained through the terminal device based on a start and an end point entered by the user, or may be obtained through the terminal device by requesting the server.

In this embodiment of this application, the server obtains, based on the reported vehicle parameter and the road condition model, an area in which a special road condition is located at the current moment, that is, the first road area, to update the map data to obtain map data at the current moment. The map data at the current moment includes the first road area. Correspondingly, after the server obtains the map data at the current moment, the terminal device may recognize whether a special road condition exists in the planned route of the vehicle, so as to recognize the special road condition in the planned route in advance. This improves real-time performance of recognizing a special road condition.

Figure 5A:
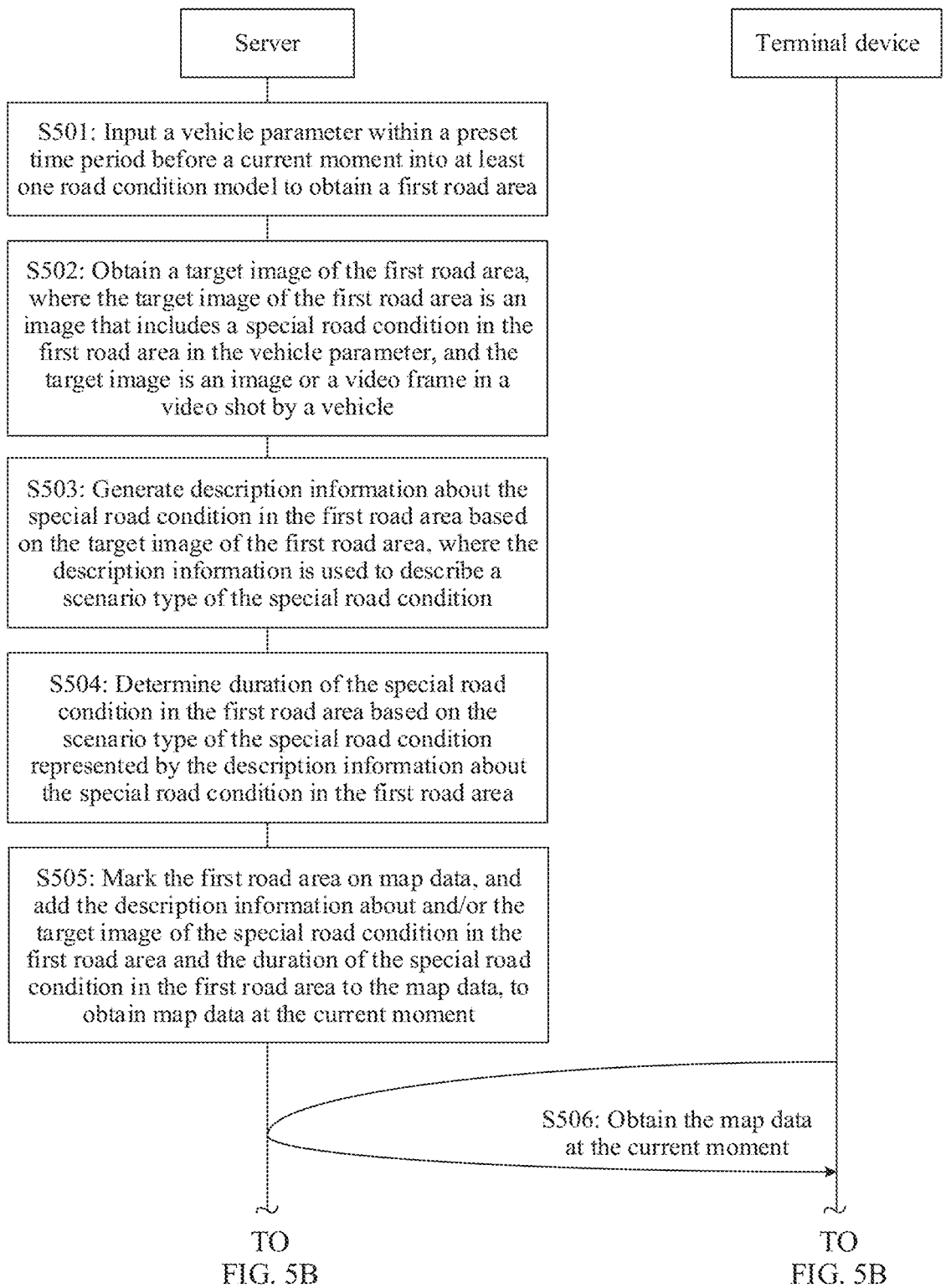

Based on the foregoing embodiment, FIG. 5A and FIG. 5B are a schematic flowchart 2 of a method for recognizing a special road condition according to an embodiment of this application. As shown in FIG. 5A and FIG. 5B, the method for recognizing a special road condition provided in this embodiment of this application may include the following steps.

S501: A server inputs a vehicle parameter within a preset time period before a current moment into at least one road condition model to obtain a first road area.

S502: The server obtains a target image of the first road area, where the target image of the first road area is an image that includes a special road condition in the first road area in the vehicle parameter, and the target image is an image or a video frame in a video shot by a vehicle.

S503: The server generates description information about the special road condition in the first road area based on the target image of the first road area, where the description information is used to describe a scenario type of the special road condition.

S504: The server determines duration of the special road condition in the first road area based on the scenario type of the special road condition represented by the description information about the special road condition in the first road area.

S505: The server marks the first road area on map data, and adds the description information about and/or the target image of the special road condition in the first road area and the duration of the special road condition in the first road area to the map data, to obtain map data at the current moment.

S506: A terminal device obtains the map data at the current moment.

S507: The terminal device determines, based on a planned route of the vehicle, whether a second road area exists in the planned route of the vehicle.

S508: If the vehicle is an autonomous vehicle and the second road area exists in the planned route of the vehicle, the terminal device generates a driving instruction, where the driving instruction is used to indicate a driving behavior of the vehicle.

S509: When the vehicle travels to the second road area, the terminal device controls traveling of the vehicle based on the driving instruction.

S510: If the vehicle is a non-autonomous vehicle, and the second road area exists in the planned route of the vehicle, the terminal device generates a reminder message, where the reminder message is used to indicate that a special road condition exists in the second road area.

S511: When the vehicle is about to travel to the second road area, the terminal device pushes the reminder message.

In step S501, there are a plurality of road condition models in this embodiment of this application. Each road condition model is used to recognize that vehicle parameters with different features are vehicle parameters corresponding to a special road condition. For example, a road condition model 1 is used to recognize a special road condition in which a manhole cover is missing, a road condition model 2 is used to recognize a special road condition in which a road is blocked, and a road condition model 3 is used to recognize a special road condition in which a vehicle slips.

Vehicle parameters reported by different vehicles are different when the vehicles pass through road areas in which different special road conditions are located. Therefore, different road condition models may be trained for the different special road conditions, to improve accuracy of recognizing the special road conditions. In this embodiment of this application, the vehicle parameter within the preset time period before the current moment may be input into at least one road condition model, to obtain the first road area. For a vehicle parameter, when the vehicle parameter is input into the road condition model 1, a result output by the road condition model 1 may be that the vehicle parameter is not a vehicle parameter corresponding to a special road condition. However, when the vehicle parameter is input into the road condition model 2, a result output by the road condition model 2 may be that the vehicle parameter is a vehicle parameter corresponding to a special road condition. In this way, it may be determined that the vehicle parameter is a vehicle parameter corresponding to a blocked road.

It should be understood that, in this embodiment of this application, a manner of obtaining the first road area may be as follows: Based on output of the at least one road condition model, it can be determined that the vehicle parameter is a vehicle parameter corresponding to a special road condition, and the vehicle parameter includes a location of the vehicle. In this embodiment of this application, an area including a preset quantity of vehicle parameters corresponding to the special road condition may be used as the first road area. For example, if vehicle parameters reported by 10 vehicles in an area 1 are all determined as vehicle parameters corresponding to a special road condition, the area 1 may be used as the first road area.

Alternatively, in this embodiment of this application, a manner of obtaining the first road area may alternatively be as follows: The vehicle parameter within the preset time period before the current moment may be input into at least one road condition model, to obtain the first road area in which a special road condition is located, without a vehicle parameter analysis process for a vehicle parameter corresponding to the special road condition.

Figure 6:
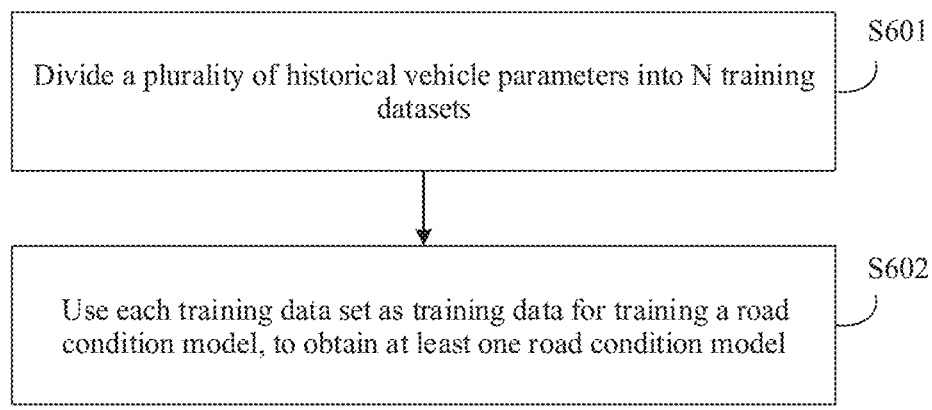
FIG. 6 is a schematic flowchart of obtaining a road condition model according to an embodiment of this application.

In this embodiment of this application, the road condition model may be obtained by using a plurality of historical vehicle parameters as training parameters. The historical vehicle parameters are vehicle parameters that are received from the at least one vehicle before the preset time period. The following specifically describes a method for obtaining a road condition model with reference to FIG. 6. FIG. 6 is a schematic flowchart of obtaining a road condition model according to an embodiment of this application. As shown in FIG. 6, the method for obtaining a road condition model in an embodiment of this application includes the following steps.

S601: Divide a plurality of historical vehicle parameters into N training datasets.

Each historical vehicle parameter may include a location of a vehicle, an image or a video shot by a vehicle, and attribute data and traveling data of a vehicle. For details of the attribute data and the traveling data, refer to related descriptions in step S201. A vehicle parameter in each training data set has a same feature, and N is an integer greater than or equal to 1.

In this embodiment of this application, special road conditions of different feature types may be obtained in advance. The special road conditions of different feature types may be features that affect the vehicle to generate different vehicle parameters. For example, a feature type of the special road conditions is: road blocking, manhole cover missing, a frozen road, a speed bump, or the like.

It is learned that the vehicle parameters are different when the vehicle encounters the special road conditions of different feature types. Therefore, in this embodiment of this application, the historical vehicle parameters may be divided into N training datasets based on features of the historical vehicle parameters. The vehicle parameter in each training data set has a same feature, that is, the vehicle parameter in each training data set is all generated under impact of special road conditions of a feature type. For example, a feature of a vehicle parameter that is generated under impact of a blocked road may be: turning right after deceleration, turning left after deceleration, or turning around after deceleration. A feature of a vehicle parameter that is generated under impact of a speed bump may be: vehicle body vibration after deceleration, or the like.

In addition, in this embodiment of this application, degrees of deceleration, vehicle body vibration, turning, and the like may be further distinguished, to determine a feature type of a special road condition corresponding to the historical vehicle parameters. In this way, the training data sets in which the historical vehicle parameters are located are obtained through division. The deceleration may include slow deceleration, abrupt deceleration, and the like. The vehicle body vibration may include small-amplitude vibration, large-amplitude vibration (for example, a vehicle body vibration amplitude may be discrete into different integer values, for example, 0-10 to implement amplitude division), and the like. The turning may include abrupt turning, slow turning, and the like.

S602: Use each training data set as training data for training a road condition model, to obtain at least one road condition model.

In this embodiment of this application, each training data set may be used as training data for training a road condition model, to train the road condition mode. In this way, the N training data sets are trained to obtain the at least one road condition model.

When a training data set is trained to obtain a road condition model, one or more vehicle parameters in the training data set may be labeled. In this case, the labeled training data set is used as training data for training a road condition model, to train the road condition model. Correspondingly, in this embodiment of this application, N (that is, at least one) road condition models may be obtained by training the N training data sets. It should be understood that the one or more vehicle parameters are labeled. For example, a vehicle parameter corresponding to deceleration in the one or more vehicle parameters is labeled as "deceleration", and a vehicle parameter corresponding to left turning is labeled as "left turning".

It should be understood that in step S201, the first road area may be obtained through the road condition model. It should be understood that the road condition model in the foregoing embodiment may be a model integrating at least one road condition model in this embodiment of this application. Therefore, a special road condition can be recognized for vehicle parameters of different features.

In step S502, after the first road area is obtained according to step S501, a feature type of the first road area in which the special road condition is located may be obtained, but a scenario type of the special road condition in the first road area cannot be determined. For example, the feature type of the special road condition is, for example, "a blocked road", "a road bumpiness", or "a road congestion". However, the scenario type of the special road condition cannot be determined, for example, "a road is blocked due to a car accident" or "a road is blocked due to a road water accumulation".

Therefore, in this embodiment of this application, the scenario type of the special road condition in the first road area may be further obtained based on the vehicle parameter, to obtain more detailed information about the special road condition in the first road area. The vehicle parameter reported by the vehicle includes an image or a video shot by a vehicle. In this embodiment of this application, the vehicle parameter reported by the vehicle in the first road area may be obtained based on the first road area and the location of the vehicle in the vehicle parameter, and the image or the video shot by the vehicle is obtained from the vehicle parameter reported in the first road area. For ease of description, the vehicle parameter reported in the first road area is referred to as a target vehicle parameter in the following description.

In this embodiment of this application, the target image of the first road area may be obtained from the target vehicle parameter. It should be understood that there may be a plurality of target vehicle parameters, and correspondingly, there are also a plurality of images or videos in the target vehicle parameters. A manner of obtaining the target image from the target vehicle parameter may be: using an image or a video frame that includes the special road condition in the first road area as a to-be-selected image, to obtain the target image from the to-be-selected image. It should be understood that the video in the target vehicle parameter may include a plurality of video frames.

Optionally, the server in this embodiment of this application may pre-store a recognition model. The recognition model is used to represent a correspondence between a feature of an image and a scenario type of a special road condition, that is, input the image into the recognition model. The recognition model may recognize whether the image is an image including a pixel block of the special road condition, to determine the scenario type of the special road condition. In this embodiment of this application, the image or the video frame in the target vehicle parameter may be input into the recognition model, and the image or the video frame including a special road condition is used as the to-be-selected image. Further, the recognition model may further output a similarity of the to-be-selected image, to represent accuracy of the to-be-selected image that includes the special road condition. In this embodiment of this application, the target image may be determined from the to-be-selected image based on image definition and similarity. For example, a to-be-selected image with highest image definition is used as the target image, or a to-be-selected image with highest similarity is used as the target image.

It should be understood that the recognition model in this embodiment of this application may be obtained through training in a machine learning manner by using a plurality of types of images including a special road condition as a training dataset. A machine learning method for training the recognition model may be the same as the foregoing method for training the road condition model.

In step S503, the description information about the special road condition in this embodiment of this application is used to describe the scenario type of the special road condition. For example, the scenario type of the special road condition may be a traffic jam, manhole cover missing, or an uneven manhole cover.

In this embodiment of this application, the type of the special road condition in the first road area may be determined based on the target image of the first road area, to generate the description information about the special road condition in the first road area based on the scenario type of the special road condition in the first road area. For example, if the type of the special road condition in the first road area is manhole cover missing, the description information about the special road condition in the first road area may be a detailed description of the scenario type of the special road condition in the first road area. For example, the description information about the special road condition in the first road area may be that a manhole cover on a first lane on a left side of an eastward direction of an XX road is missing.

In this embodiment of this application, a manner of determining the type of the special road condition in the first road area may be: The recognition model is used to represent a correspondence between a feature of an image and a scenario type of a special road condition, that is, input the image into the recognition model, to obtain the scenario type of the special road condition in the image.

Another manner of determining the type of the special road condition in the first road area may be: There may be a plurality of recognition models. Each recognition model is used to represent a correspondence between a special road condition of a scenario type and a feature of an image. In this embodiment of this application, the image or the video frame in the target vehicle parameter may be input into a plurality of recognition models, and the input image is a scenario type of the special road condition represented by the recognition model of the special road condition, that is, the scenario type of the special road condition included in the image. For example, a recognition model 1 is used to represent a correspondence between manhole cover missing and a feature of an image, that is, recognize an image including the manhole cover missing. A recognition model 2 is used to represent a correspondence between a traffic jam and a feature of an image, that is, recognize an image including the traffic jam. A recognition model 3 is used to represent a correspondence between a speed bump and a feature of an image, that is, recognize an image including the speed bump.

In this manner, a machine learning method used for training each recognition model may be the same as the foregoing method for training the recognition model. However, it should be noted that the training data for training each recognition model is different from the training data for training the recognition model. In the method, the training data used for training each recognition model is an image that includes special road conditions of a same scenario type, and the training data used for training the recognition model is an image that includes special road conditions of various scenario types. For example, in this embodiment of this application, training data for training the recognition model 1 may be a plurality of images including manhole cover missing.

In step S504, the duration of the special road condition in the first road area is a time from a current moment to a moment at which the first road area is eliminated. It should be understood that the duration of the special road condition in the first road area may be determined based on an empirical average value obtained through statistics collection on big data, or may be a time from occurrence to elimination of the special road condition. In this embodiment of this application, the duration of the special road condition in the first road area may be determined based on the scenario type of the special road condition in the first road area. Optionally, the server stores an empirical value of duration of a special road condition of each scenario type. The empirical value may be entered by a user (a technical person), or may be obtained by the server based on duration of a historical special road condition. For example, the server may use an average value, a maximum value, or a minimum value of the duration of the historical special road condition as duration of a special road condition whose scenario type is the same as that of the historical special road condition. For example, if a special road condition is that duration of manhole cover missing is one day, a special road condition is that duration of a debris flow is four hours, or the like.

In step S505, in this embodiment of this application, after the first road area, the description information about and/or the target image of the special road condition in the first road area, and the duration of the special road condition in the first road area are/is obtained, the first road area may be marked in the map data. In addition, the description information about and/or the target image of the special road condition in the first road area and the duration of the special road condition in the first road area are/is added to the map data. That is, the current map data includes the first road area, the description information about and/or the target image of the special road condition in the first road area, and the duration of the special road condition in the first road area.

It should be understood that, for implementations of steps S506 to S507 in this embodiment of this application, refer to related descriptions of steps S203 and S204 in the foregoing embodiment. Details are not described herein again.

In step S508, if the vehicle is the autonomous vehicle, and the second road area exists in the planned route of the vehicle, in this embodiment of this application, a driving decision, that is, the driving instruction, may be generated for the autonomous vehicle. The driving instruction is used to indicate the driving behavior of the vehicle. For example, the driving instruction may be an instruction that instructs the vehicle to decelerate and turn right, or an instruction that instructs the vehicle to decelerate.

As there are a plurality of road condition models in this embodiment of this application, and the map data further includes the description information about the special road condition in the first road area, in this embodiment of this application, the driving instruction may be generated based on description information about a special road condition in the second road area. It should be understood that the driving behavior indicated by the driving instruction is the same as a driving behavior indicated by a feature of a historical vehicle parameter used to obtain a target road condition model, and the target road condition model is a model for determining the second road area as the special road condition. In other words, in this embodiment of this application, the model for inputting the second road area as the special road condition is used as the target road condition model, and a driving behavior indicated by a feature of a historical vehicle parameter for training the target road condition model is used as the driving instruction. For example, when manhole cover missing exists in the second road area, a model for outputting the second road area as a special road condition is a road condition model 2, and a feature of a historical vehicle parameter for training the road condition model 2 is decelerating first and then turning right. In this case, the decelerating first and then turning right may be used as the driving instruction for the second road area.

In step S509, when the autonomous vehicle travels to the second road area, the terminal device controls traveling of the vehicle based on the driving instruction. Specifically, in this embodiment of this application, the driving instruction for the autonomous vehicle in the second road area may be generated in advance in step S508, so that the autonomous vehicle may be reminded in advance. In this case, the autonomous vehicle can travel based on the driving instruction when traveling to the second road area. For example, if the driving instruction for the second road area is to decelerate first and then turn right, the autonomous vehicle may decelerate first and then turn right when traveling to the second road area.

Optionally, to further improve safety of the autonomous vehicle, in this embodiment of this application, the driving instruction may be further executed at a preset distance before the autonomous vehicle travels to the second road area. For example, when there is still one meter away from the second road area, the vehicle decelerates first and then turns right.

In step S510, if the vehicle is a non-autonomous vehicle, and the second road area exists in the planned route of the vehicle, the reminder message may be generated in this embodiment of this application, to remind a user driving the vehicle. The map data further includes the description information about and/or the target image of the special road condition in the first road area. In the reminder message generated in this embodiment of this application, the description information about and/or the target image of the special road condition in the second road area may be used as the reminder message.

In step S511, to remind the user of the special road condition in the second road area in advance, the terminal device may push the reminder message when the vehicle is about to travel to the second road area. Specifically, a manner of pushing the reminder message may be playing the description information about the special road condition in the second road area, and/or displaying the target image of the special road condition in the second road area.

For example, if the scenario type of the special road condition in the first road area is the manhole cover missing, the description information about the special road condition in the first road area may be that a manhole cover on a first lane on a left side of an eastward direction of an XX road is missing. In this embodiment of this application, when the vehicle is about to travel to the second road area (for example, there is a preset distance from the second road area), the reminder message "a manhole cover on a first lane on a left side of an eastward direction of an XX road is missing" may be played, and the target image of the special road condition in the second road area is displayed on a display screen of the terminal device.

Figure 7:
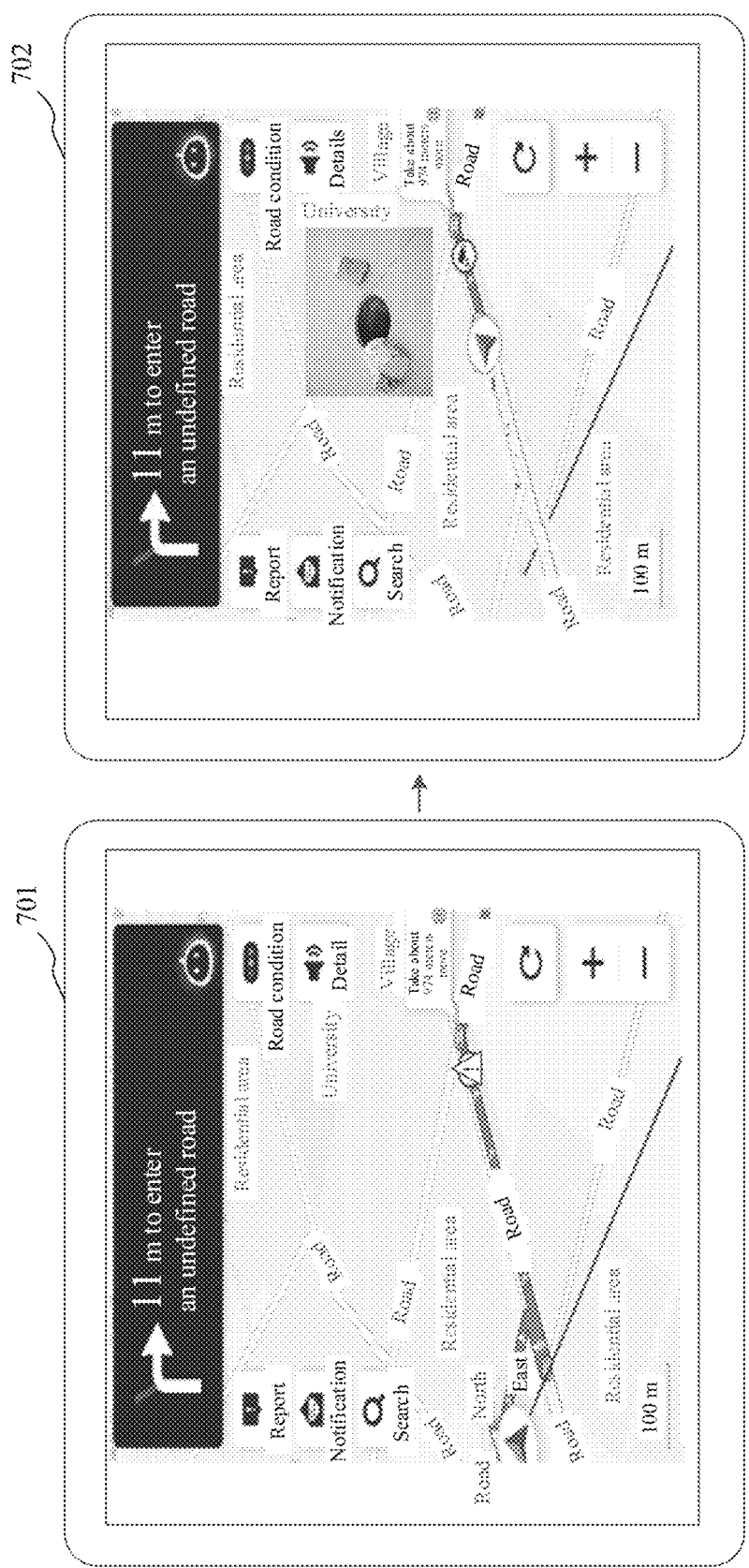
FIG. 7 is a schematic diagram 1 of an interface change of a terminal device according to an embodiment of this application.

FIG. 7 is a schematic diagram 1 of an interface change of a terminal device according to an embodiment of this application. As shown in an interface 701 in FIG. 7, the interface 701 displays a navigation interface of a vehicle. When the vehicle is about to travel to a second road area, the interface 701 may jump to an interface 702. The interface 702 displays a target image of a special road condition in the second road area. For example, the interface 702 displays an image of "manhole cover missing" in the second road area. It should be understood that an example in which the terminal device is an in-vehicle terminal is used for description in this embodiment of this application.

Figure 8:
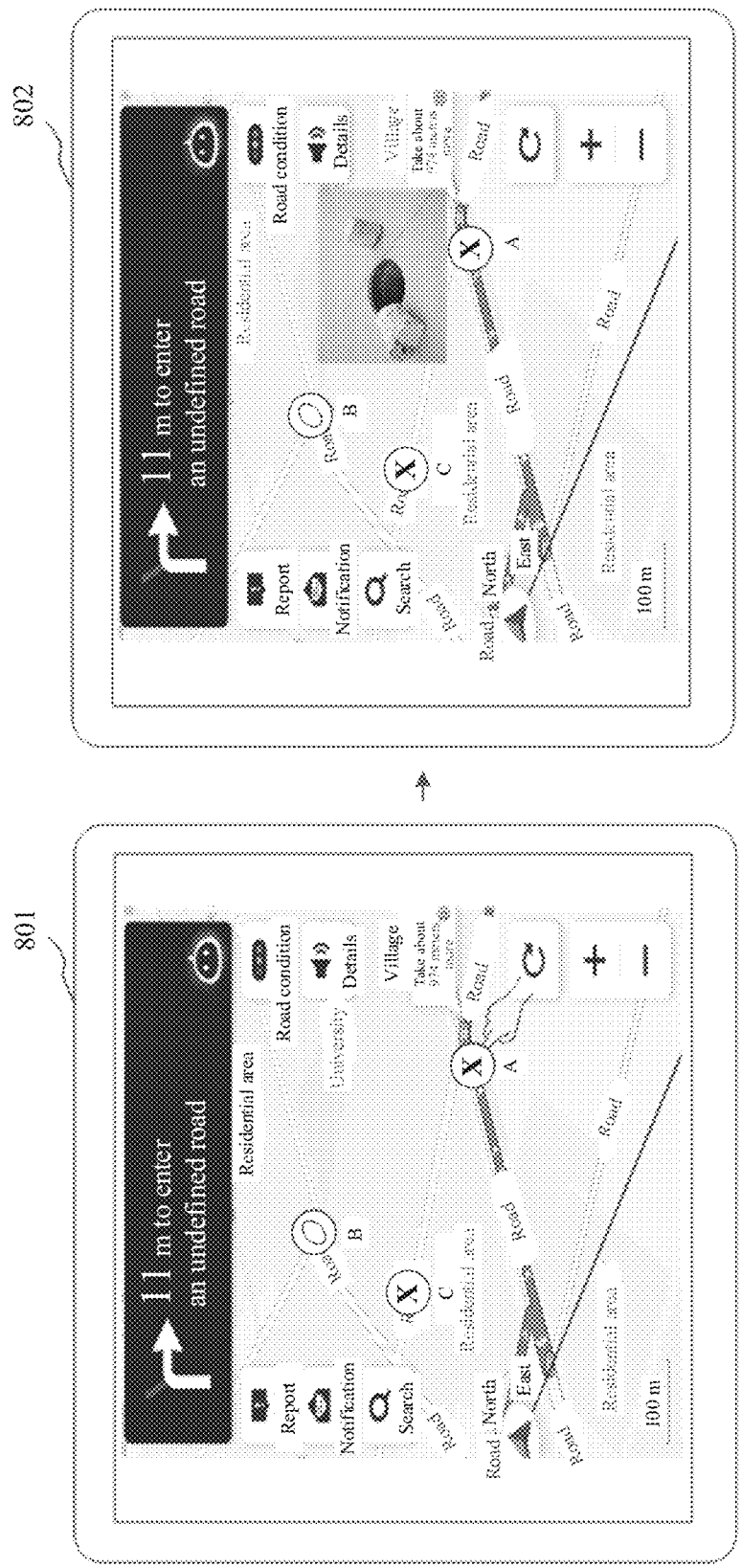
FIG. 8 is a schematic diagram 2 of an interface change of a terminal device according to an embodiment of this application.

Optionally, in this embodiment of this application, there are a plurality of first road areas, and an identifier of a special road condition in each first road area may be further displayed on a map. FIG. 8 is a schematic diagram 2 of an interface change of a terminal device according to an embodiment of this application. As shown in an interface 801 in FIG. 8, the interface 801 displays an identifier of a special road condition in a first road area on the navigation interface of the vehicle displayed in the interface 701.

For example, identifiers of special road conditions in the first road area may be the same, for example, are all icons each with an exclamation mark. Alternatively, the identifier of the special road condition in the first road area may represent a scenario type of the special road condition in the first road area. As shown in the interface 801 in FIG. 8, when the special road condition in the first road area includes manhole cover missing, an uneven manhole cover, or a debris flow, a corresponding identifier may be displayed at a location corresponding to the first road area on the map. For example, an identifier 1 indicating manhole cover missing is marked at a location A, an identifier 2 indicating an uneven manhole cover is marked at a location B, and an identifier 3 indicating manhole cover missing is marked at a location C.

In this embodiment of this application, the terminal device receives a selection instruction from a user for an identifier of a special road condition in any first road area, and displays description information about the special road condition in the first road area that is selected by the user, so that the user obtains a scenario type of the selected special road condition in the first road area. For example, if the user selects the identifier 1 by tapping, the interface 801 jumps to an interface 802. The interface 802 displays description information about a special road condition at the location A, for example, a manhole cover on a first lane on a left side of an eastward direction of an XX road is missing.

It should be understood that steps S508-S509 or steps S510-S511 are steps that are selected to be performed. It should be understood that steps S508-S509 are steps performed when the vehicle is an autonomous vehicle, and steps S510-S511 are steps performed when the vehicle is a non-autonomous vehicle.

Steps S507-S511 may be a scenario in which the vehicle travels. In this scenario, map data further includes duration of the special road condition in the first road area. If a second road area exists in a planned route of the vehicle, a scenario type of the special road condition in the second road area is a preset scenario type, and time in which the vehicle travels to the second road area is less than duration of the special road condition in the second road area, a server may be requested to update the planned route of the vehicle, to obtain an updated planned route. Optionally, the preset scenario type is a pre-determined scenario type, and may be a scenario type of the special road condition in which the vehicle cannot quickly pass, for example, a traffic jam or a debris flow.

For example, if the second road area exists in the planned route of the vehicle, the scenario type of the special road condition in the second road area is the debris flow, it takes 30 minutes for the vehicle to travel to the second road area, and duration of the debris flow in the second road area is four hours, the server may be requested to update the planned route of the vehicle, to avoid the second road area. In this way, the updated planned route is obtained and further displayed on the terminal device. Optionally, a reason for updating the planned route may be further displayed on the terminal device, for example, a text reminder message "There is a debris flow ahead, and a route has been updated for you".

The planned route of the vehicle may be obtained through the terminal device by requesting the server. When receiving a route planning request entered by the user, the terminal device may send the route planning request to the server. After receiving the route planning request from the terminal device, the server may obtain the planned route based on a start point and an end point, the duration of the special road condition in the first road area, and the scenario type of the special road condition in the first road area. When designing a planned route, the server may avoid planning a route that includes a special road condition of the preset scenario type.

The road condition model in this embodiment of this application is obtained after massive historical vehicle parameters are trained. Therefore, recognition of the first road area at the current moment through the road condition model has high accuracy. In addition, in this embodiment of this application, the terminal device may generate a driving decision or reminder message in advance based on the current map data, to remind the autonomous vehicle and the non-autonomous vehicle in advance. This improves user experience. In addition, the terminal device may further update a preplanned preset route based on the current map data, or set a preset route for the vehicle. This can further improve user experience.

Figure 9:
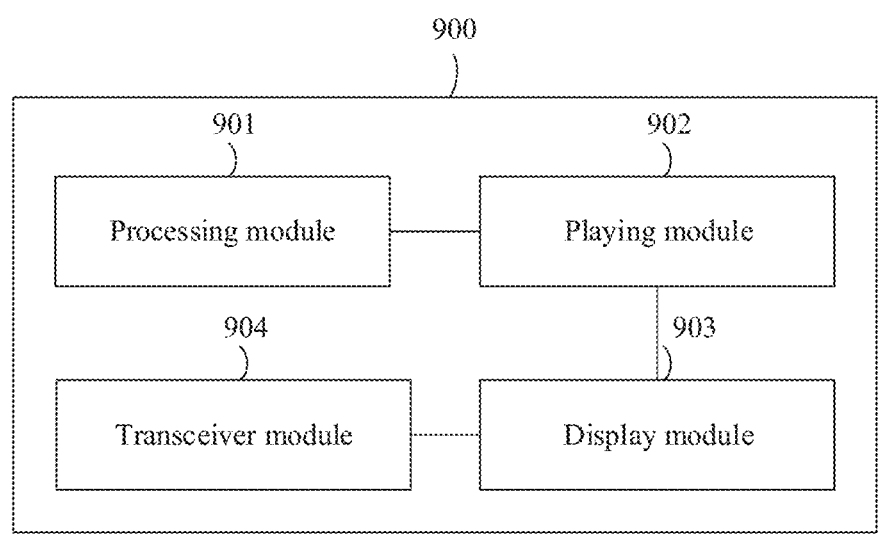
FIG. 9 is a schematic diagram 1 of a structure of an apparatus for recognizing a special road condition according to an embodiment of this application.

FIG. 9 is a schematic diagram 1 of a structure of an apparatus for recognizing a special road condition according to an embodiment of this application. As shown in FIG. 9, the apparatus for recognizing a special road condition may be the terminal device in the foregoing embodiments. The apparatus 900 for recognizing a special road condition includes a processing module 901, a play module 902, a display module 903, and a transceiver module 904.

The processing module 901 is configured to: obtain map data at a current moment, where the map data includes a first road area at the current moment; and determine, based on a planned route of a vehicle, whether a second road area exists in the planned route of the vehicle, where the second road area is a road area in the first road area, the first road area is a road area in which the special road condition is located, the first road area is obtained based on a road condition model and a vehicle parameter within a preset time period before the current moment, and the road condition model is used to represent a correspondence between a feature of the vehicle parameter and the special road condition.

Optionally, if the vehicle is an autonomous vehicle, the processing module 901 is further configured to: if the second road area exists in the planned route of the vehicle, generate a driving instruction; and when the vehicle travels to the second road area, control traveling of the vehicle based on the driving instruction, where the driving instruction is used to indicate a driving behavior of the vehicle.

Optionally, there are a plurality of road condition models, the map data further includes description information about the special road condition in the first road area, and the description information is used to describe a scenario type of the special road condition.

Correspondingly, the processing module 901 is specifically configured to generate the driving instruction based on description information about a special road condition in the second road area. The driving behavior indicated by the driving instruction is the same as a driving behavior indicated by a feature of a historical vehicle parameter used to obtain a target road condition model. The target road condition model is a model for determining the second road area as the special road condition.

Optionally, if the vehicle is a non-autonomous vehicle, the processing module 901 is further configured to: generate a reminder message if the second road area exists in the planned route of the vehicle; and push the reminder message when the vehicle is about to travel to the second road area, where the reminder message is used to indicate that a special road condition exists in the second road area.

Optionally, the map data at the current moment further includes description information about and/or a target image of the special road condition in the first road area. The description information is used to describe a scenario type of the special road condition. The target image of the first road area is an image that includes the special road condition in the first road area in the vehicle parameter.

Correspondingly, the processing module 901 is specifically configured to use description information about and/or a target image of the special road condition in the second road area as the reminder message.

The play module 902 is configured to play the description information about the special road condition in the second road area; and/or,
the display module 903 is configured to display the target image of the special road condition in the second road area.

Optionally, the map data further includes duration of the special road condition in the first road area.

Optionally, there are a plurality of first road areas. The display module 903 is further configured to display an identifier of a special road condition in each first road area on a map.

The transceiver module 904 is configured to receive a selection instruction from a user for an identifier of a special road condition in any first road area. Correspondingly, the display module 903 is further configured to display description information about the special road condition in the first road area selected by the user.

Optionally, the transceiver module 904 is further configured to: send a route planning request to a server, and receive the planned route sent by the server.

Optionally, the map data further includes duration of the special road condition in the first road area.

Optionally, the transceiver module 904 is further configured to report a vehicle parameter to the server. The vehicle parameter includes a location of the vehicle, an image or a video shot by the vehicle, and attribute data and traveling data of the vehicle.

For beneficial effects of the apparatus for recognizing a special road condition provided in this embodiment of this application, refer to the beneficial effects in the foregoing method for recognizing a special road condition. Details are not described herein again.

Figure 10:
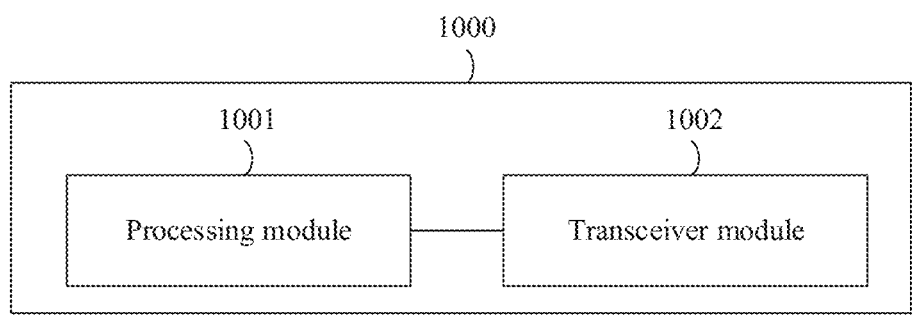
FIG. 10 is a schematic diagram 2 of a structure of an apparatus for recognizing a special road condition according to an embodiment of this application.

FIG. 10 is a schematic diagram 2 of a structure of an apparatus for recognizing a special road condition according to an embodiment of this application. As shown in FIG. 10, the apparatus for recognizing a special road condition may be the server in the foregoing embodiment. The apparatus 1000 for recognizing a special road condition includes a processing module 1001 and a transceiver module 1002.

The processing module 1001 is configured to: obtain a first road area at a current moment based on a road condition model and a vehicle parameter within a preset time period before the current moment; and mark the first road area on map data to obtain map data at the current moment. The first road area is a road area in which the special road condition is located. The road condition model is used to represent a correspondence between a feature of the vehicle parameter and the special road condition.

Optionally, the vehicle parameter includes a location of a vehicle.

The transceiver module 1002 is configured to receive, within the preset time period, a vehicle parameter reported by at least one vehicle.

Correspondingly, the processing module 1001 is further configured to determine, based on the vehicle parameter of the at least one vehicle, the vehicle parameter within the preset time period before the current moment. The vehicle parameter within the preset time period before the current moment is a vehicle parameter that does not match a feature of a road at the location of the vehicle in the map data.

Optionally, the processing module 1001 is further configured to obtain the road condition model by using a plurality of historical vehicle parameters as training parameters. The historical vehicle parameters are vehicle parameters that are received from the at least one vehicle before the preset time period.

Optionally, there are a plurality of road condition models.

The processing module 1001 is specifically configured to: divide the plurality of historical vehicle parameters into N training data sets, where a vehicle parameter in each training data set has a same feature, and N is an integer greater than 1; and use each training data set as training data for training a road condition model, to obtain at least one road condition model.

Optionally, the processing module 1001 is specifically configured to input the vehicle parameter within the preset time period before the current moment into the at least one road condition model to obtain the first road area.

Optionally, the vehicle parameter includes an image or a video shot by the vehicle.

The processing module 1001 is further configured to: obtain a target image of the first road area; generate description information about the special road condition in the first road area based on the target image of the first road area and add the description information about and/or the target image of the special road condition in the first road area to the map data. The target image of the first road area is an image that includes the special road condition in the first road area in the vehicle parameter. The target image is the image or a video frame in the video shot by the vehicle. The description information is used to describe a scenario type of the special road condition.

Optionally, the processing module 1001 is further configured to: determine duration of the special road condition in the first road area based on the scenario type of the special road condition represented by the description information about the special road condition in the first road area; and add the duration of the special road condition in the first road area to the map data.

Optionally, the processing module 1001 is further configured to: if a route planning request from a terminal device is received, obtain a planned route based on a start point and an end point, the duration of the special road condition in the first road area, and the scenario type of the special road condition in the first road area. The route planning request includes the start point and the end point.

The transceiver module 1002 is further configured to push the planned route to the terminal device.

Optionally, the vehicle parameter includes attribute data and traveling data of the vehicle.

For beneficial effects of the apparatus for recognizing a special road condition provided in this embodiment of this application, refer to the beneficial effects in the foregoing method for recognizing a special road condition. Details are not described herein again.

Figure 11:
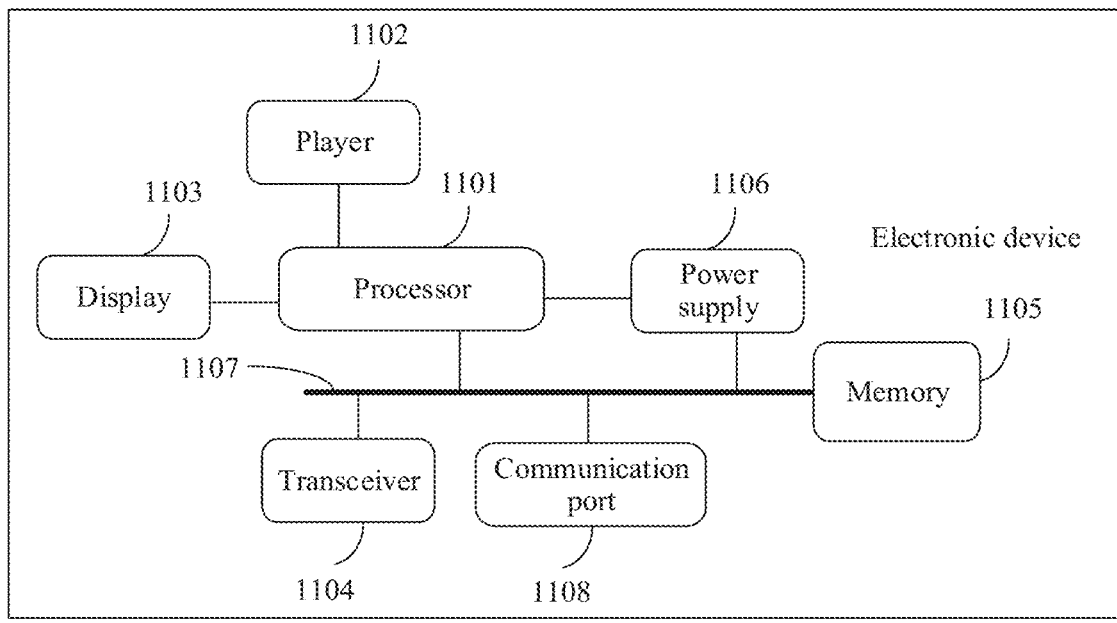
FIG. 11 is a schematic diagram 1 of a structure of an electronic device according to an embodiment of this application.

FIG. 11 is a schematic diagram 1 of a structure of an electronic device according to an embodiment of this application. As shown in FIG. 11, the electronic device may be the terminal device in FIG. 9, and the electronic device may include a processor 1101, a player 1102, a display 1103, a transceiver 1104, and a memory 1105. It should be understood that the processor 1101 performs an action of the processing module 901, the player 1102 performs an action of the play module 902, the display 1103 performs an action of the display module 903, and the transceiver 1104 performs an action of the transceiver module 904. The memory 1105 may store various instructions, so as to complete various processing functions and implement the method steps of this application.

The transceiver 1104 is coupled to the processor 1101, and the processor 1101 controls sending and receiving actions of the transceiver 1104 (1202). The memory 1105 may include a high-speed random-access memory (RAM), or may further include a non-volatile memory (NVM), for example, at least one magnetic disk memory. Optionally, the electronic device in this application may further include a power supply 1106, a communication bus 1107, and a communication port 1108. The transceiver 1104 may be integrated into a transceiver of the terminal device, or may be an independent transceiver antenna of the terminal device. The communication bus 1107 is configured to implement communication and connection between elements. The communication port 1108 is configured to implement connection and communication between the terminal device and another peripheral. The display 1103 may be connected to the processor 1101, to display the setting interface in the foregoing embodiment under control of the processor 1101.

In this embodiment of this application, the memory 1105 is configured to store computer executable program code. The program code includes instructions. When the processor 1101 executes the instructions, the instructions enable the processor 1101 of the terminal device to perform the processing action of the terminal device in the foregoing method embodiments and enable the transceiver 1104 to perform the sending and receiving actions of the terminal device in the foregoing method embodiments. Implementation principles and technical effects thereof are similar, and are not described herein again.

Figure 12:
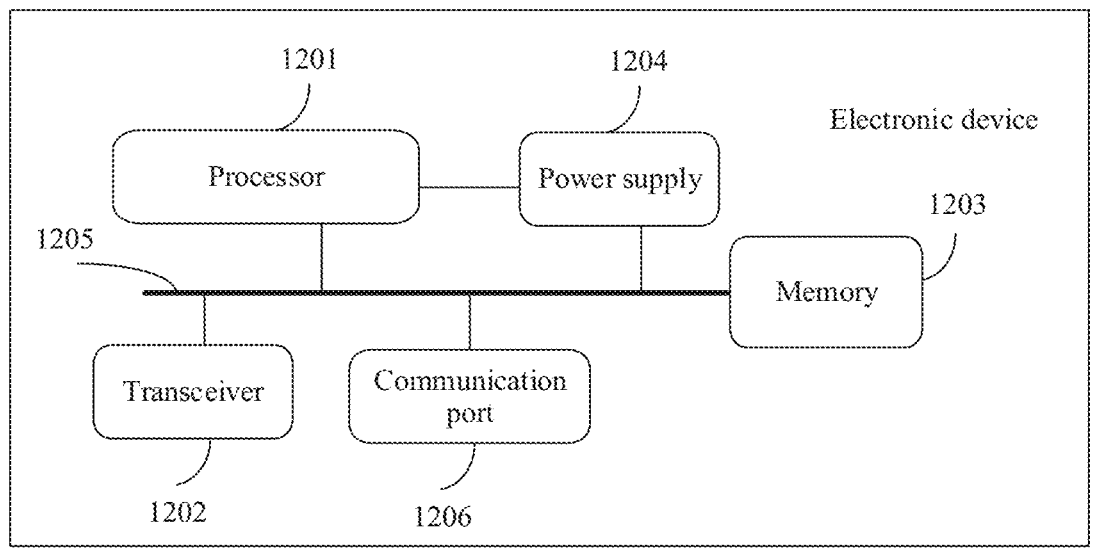
FIG. 12 is a schematic diagram 2 of a structure of an electronic device according to an embodiment of this application.

FIG. 12 is a schematic diagram 2 of a structure of an electronic device according to an embodiment of this application. As shown in FIG. 12, the electronic device may be the server in FIG. 10, and the electronic device may include a processor 1201, a transceiver 1202, and a memory 1203. It should be understood that the processor 1201 performs an action of the processing module 1001, and the transceiver 1202 performs an action of the transceiver module 1002. The memory 1203 may store various instructions, so as to complete various processing functions and implement the method steps of this application.

The transceiver 1202 is coupled to the processor 1201, and the processor 1201 controls sending and receiving actions of the transceiver 1202. The memory 1203 may include a high-speed random-access memory (RAM), or may further include a non-volatile memory (NVM), for example, at least one magnetic disk memory. Optionally, the electronic device in this application may further include a power supply 1204, a communication bus 1205, and a communication port 1206. The transceiver 1202 may be integrated into a transceiver of the terminal device, or may be an independent transceiver antenna of the terminal device. The communication bus 1205 is configured to implement communication and connection between elements. The communication port 1206 is configured to implement connection and communication between the terminal device and another peripheral. The display 1103 may be connected to the processor 1201, to display the setting interface in the foregoing embodiment under control of the processor 1201.

In this embodiment of this application, the memory 1203 is configured to store computer executable program code. The program code includes instructions. When the processor 1201 executes the instructions, the instructions enable the processor 1201 of the terminal device to perform the processing action of the terminal device in the foregoing method embodiments and enable the transceiver 1202 to perform the sending and receiving actions of the terminal device in the foregoing method embodiments. Implementation principles and technical effects thereof are similar, and are not described herein again.

All or some of foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The term "a plurality of" in this specification means two or more. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In a formula, the character "/" indicates a "division" relationship between associated objects.

It may be understood that various numbers in embodiments of this application are merely used for differentiation for ease of description, and are not used to limit the scope of embodiments of this application.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

What is claimed is:

1. An apparatus for recognizing a special road condition, applied to a terminal device, and comprising:
   at least one processor; and
   at least one memory coupled to the at least one processor and storing programming instructions for execution by the at least one processor to:
   obtain map data at a current moment, wherein the map data comprises a first road area at the current moment, the special road condition is located in the first road area, the first road area is obtained by a server based on a road condition model and a vehicle parameter within a preset time period before the current moment, and the road condition model represents a correspondence between a feature of the vehicle parameter and the special road condition;
   determine, based on a planned route of a vehicle, that a second road area exists in the planned route of the vehicle, wherein the second road area is in the first road area; and
   generate a driving instruction based on description information about the special road condition, wherein the driving instruction indicates a driving behavior of the vehicle, wherein the driving behavior indicated by the driving instruction is same as a driving behavior indicated by a feature of a historical vehicle parameter used to obtain a target road condition model, and the target road condition model is a model for determining that the second road area comprises the special road condition.

2. The apparatus according to claim 1, wherein the vehicle is an autonomous vehicle, the second road area exists in the planned route of the vehicle, and the programming instructions are for execution by the at least one processor to:
   control traveling of the vehicle based on the driving instruction when the vehicle travels to the second road area.

3. The apparatus according to claim 2, wherein there are a plurality of road condition models, the map data further comprises the description information about the special road condition in the first road area, the description information describes a scenario type of the special road condition.

4. The apparatus according to claim 1, wherein the vehicle is a non-autonomous vehicle, the second road area exists in the planned route of the vehicle, and the programming instructions are for execution by the at least one processor to:
generate a reminder message indicating that the special road condition exists in the second road area; and
push the reminder message when the vehicle is about to travel to the second road area.

5. The apparatus according to claim 4, wherein the programming instructions are for execution by the at least one processor to:
use at least one of the description information about the special road condition in the second road area or a target image of the special road condition in the second road area as the reminder message; and
play the description information about the special road condition in the second road area.

6. The apparatus according to claim 4, wherein the map data further comprises a target image of the special road condition in the first road area, the target image of the special road condition in the first road area comprises the special road condition in the first road area, and the programming instructions are for execution by the at least one processor to:
use at least one of the description information about the special road condition in the second road area or a target image of the special road condition in the second road area as the reminder message; and
display the target image of the special road condition in the second road area.

7. The apparatus according to claim 5, wherein there are a plurality of first road areas, and the programming instructions are for execution by the at least one processor to:
display an identifier of a special road condition in each first road area on a map;
receive a selection instruction from a user for an identifier of a special road condition in any first road area; and
display description information about the special road condition in the first road area selected by the user.

8. The apparatus according to claim 1, wherein the programming instructions are for execution by the at least one processor to:
send a route planning request to the server; and
receive the planned route sent by the server.

9. The apparatus according to claim 1, wherein the programming instructions are for execution by the at least one processor to:
report the vehicle parameter to the server, wherein the vehicle parameter comprises a location of the vehicle, an image or a video shot by the vehicle, and attribute data and traveling data of the vehicle.

10. An apparatus for recognizing a special road condition, applied to a server, and comprising:
at least one processor; and
at least one memory coupled to the at least one processor and storing programming instructions for execution by the at least one processor to:
obtain a first road area at a current moment based on a road condition model and a vehicle parameter within a preset time period before the current moment, wherein the special road condition is located in the first road area, and the road condition model represents a correspondence between a feature of the vehicle parameter and the special road condition; and
mark the first road area on map data to obtain map data at the current moment, wherein a driving instruction is generated based on description information about the special road condition, wherein a driving behavior indicated by the driving instruction is same as a driving behavior indicated by a feature of a historical vehicle parameter used to obtain a target road condition model, and the target road condition model is a model for determining that a second road area in the first road area comprises the special road condition.

11. The apparatus according to claim 10, wherein the vehicle parameter comprises a location of a vehicle, and the programming instructions are for execution by the at least one processor to:
receive, within the preset time period, at least one vehicle parameter reported by at least one vehicle; and
determine, based on the at least one vehicle parameter, the vehicle parameter within the preset time period before the current moment, wherein the vehicle parameter within the preset time period before the current moment does not match a feature of a road at the location of the vehicle in the map data.

12. The apparatus according to claim 10, wherein the programming instructions are for execution by the at least one processor to:
obtain the road condition model by using a plurality of historical vehicle parameters as training parameters, wherein the historical vehicle parameters are received from at least one vehicle before the preset time period.

13. The apparatus according to claim 12, wherein there are a plurality of road condition models, and the programming instructions are for execution by the at least one processor to:
divide the plurality of historical vehicle parameters into N training data sets, wherein a vehicle parameter in each training data set has a same feature, and N is an integer greater than 1; and
use each training data set as training data to obtain at least one road condition model comprising the road condition model.

14. The apparatus according to claim 13, wherein the programming instructions are for execution by the at least one processor to:
input the vehicle parameter within the preset time period before the current moment into the at least one road condition model to obtain the first road area.

15. The apparatus according to claim 10, wherein the vehicle parameter comprises an image or a video shot by a vehicle, and the programming instructions are for execution by the at least one processor to:
obtain a target image of the first road area, wherein the target image of the first road area comprises the special road condition in the first road area, and the target image is the image or a video frame in the video shot by the vehicle;
generate description information about the special road condition in the first road area based on the target image of the first road area, wherein the description information describes a scenario type of the special road condition; and
add at least one of the description information or the target image of the first road area to the map data.

16. The apparatus according to claim 15, wherein the programming instructions are for execution by the at least one processor to:
  determine a duration of the special road condition in the first road area based on the scenario type of the special road condition represented by the description information about the special road condition in the first road area; and
  add the duration of the special road condition in the first road area to the map data.

17. The apparatus according to claim 16, wherein the programming instructions are for execution by the at least one processor to:
  receive a route planning request from a terminal device;
  obtain a planned route based on a start point and an end point, the duration of the special road condition in the first road area, and the scenario type of the special road condition in the first road area, wherein the route planning request comprises the start point and the end point; and
  push the planned route to the terminal device.

18. The apparatus according to claim 10, wherein the vehicle parameter comprises attribute data and traveling data of a vehicle.

19. A computer program product comprising computer-executable instructions that are stored on a non-transitory computer-readable medium and that, when executed by at least one processor, cause an apparatus to:
  obtain map data at a current moment, wherein the map data comprises a first road area at the current moment, a special road condition is located in the first road area, the first road area is obtained by a server based on a road condition model and a vehicle parameter within a preset time period before the current moment, and the road condition model represents a correspondence between a feature of the vehicle parameter and the special road condition;
  determine, based on a planned route of a vehicle, that a second road area exists in the planned route of the vehicle, wherein the second road area is in the first road area; and
  generate a driving instruction based on description information about the special road condition, wherein the driving instruction indicates a driving behavior of the vehicle, wherein the driving behavior indicated by the driving instruction is same as a driving behavior indicated by a feature of a historical vehicle parameter used to obtain a target road condition model, and the target road condition model is a model for determining that the second road area comprises the special road condition.

20. The computer program product according to claim 19, wherein the vehicle is an autonomous vehicle, the second road area exists in the planned route of the vehicle, and when the computer-executable instructions are executed by the at least one processor, cause the apparatus to:
  control traveling of the vehicle based on the driving instruction when the vehicle travels to the second road area.

21. The computer program product according to claim 20, wherein there are a plurality of road condition models, the map data further comprises the description information about the special road condition in the first road area, the description information describes a scenario type of the special road condition.

22. The computer program product according to claim 20, wherein the vehicle is a non-autonomous vehicle, the second road area exists in the planned route of the vehicle, and when the computer-executable instructions are executed by the at least one processor, cause the apparatus to:
  generate a reminder message indicating that the special road condition exists in the second road area; and
  push the reminder message when the vehicle is about to travel to the second road area.

23. The computer program product according to claim 20, wherein when the computer-executable instructions are executed by the at least one processor, cause the apparatus to:
  send a route planning request to the server; and
  receive the planned route sent by the server.

24. The computer program product according to claim 20, wherein when the computer-executable instructions are executed by the at least one processor, cause the apparatus to:
  report the vehicle parameter to the server, wherein the vehicle parameter comprises a location of the vehicle, an image or a video shot by the vehicle, and attribute data and traveling data of the vehicle.

25. A computer program product comprising computer-executable instructions that are stored on a non-transitory computer-readable medium and that, when executed by at least one processor, cause an apparatus to:
  obtain a first road area at a current moment based on a road condition model and a vehicle parameter within a preset time period before the current moment, wherein a special road condition is located in the first road area, and the road condition model represents a correspondence between a feature of the vehicle parameter and the special road condition; and
  mark the first road area on map data to obtain map data at the current moment, wherein a driving instruction is generated based on description information about the special road condition, wherein a driving behavior indicated by the driving instruction is same as a driving behavior indicated by a feature of a historical vehicle parameter used to obtain a target road condition model, and the target road condition model is a model for determining that a second road area in the first road area comprises the special road condition.

26. The computer program product according to claim 25, wherein the vehicle parameter comprises a location of a vehicle, and when the computer-executable instructions are executed by the at least one processor, cause the apparatus to:
  receive, within the preset time period, at least one vehicle parameter reported by at least one vehicle; and
  determine, based on the at least one vehicle parameter, the vehicle parameter within the preset time period before the current moment, wherein the vehicle parameter within the preset time period before the current moment does not match a feature of a road at the location of the vehicle in the map data.

27. The computer program product according to claim 25, wherein when the computer-executable instructions are executed by the at least one processor, cause the apparatus to:
  obtain the road condition model by using a plurality of historical vehicle parameters as training parameters, wherein the historical vehicle parameters are received from at least one vehicle before the preset time period.

28. The computer program product according to claim 27, wherein there are a plurality of road condition models, and when the computer-executable instructions are executed by the at least one processor, cause the apparatus to:

divide the plurality of historical vehicle parameters into N training data sets, wherein a vehicle parameter in each training data set has a same feature, and N is an integer greater than 1; and use each training data set as training data to obtain at least one road condition model comprising the road condition model.

29. The computer program product according to claim 25, wherein the vehicle parameter comprises an image or a video shot by a vehicle, and when the computer-executable instructions are executed by the at least one processor, cause the apparatus to:

obtain a target image of the first road area, wherein the target image of the first road area comprises the special road condition in the first road area, and the target image is the image or a video frame in the video shot by the vehicle;

generate description information about the special road condition in the first road area based on the target image of the first road area, wherein the description information describes a scenario type of the special road condition; and add at least one of the description information or the target image of the first road area to the map data.

30. The computer program product according to claim 25, wherein the vehicle parameter comprises attribute data and traveling data of a vehicle.

\* \* \* \* \*